(12) United States Patent
Kelly et al.

(10) Patent No.: US 10,672,009 B2
(45) Date of Patent: *Jun. 2, 2020

(54) METHOD FOR AUTHENTICATING FINANCIAL INSTRUMENTS AND FINANCIAL TRANSACTION REQUESTS

(71) Applicant: Capital One Financial Corporation, McLean, VA (US)

(72) Inventors: James John Kelly, Hockessin, DE (US); Robert Dean Rowley, III, Garnet Valley, PA (US); Todd Adam Sandler, Gladwyne, PA (US); Daniel Lloyd Struble, Newark, NJ (US); Rudolph Christian Wolfs, Hockessin, DE (US); Joseph DeLiberis, Gibbstown, NJ (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 406 days.

This patent is subject to a terminal disclaimer.

(21) Appl. No.: 15/655,971

(22) Filed: Jul. 21, 2017

(65) Prior Publication Data
US 2018/0012234 A1 Jan. 11, 2018

Related U.S. Application Data

(63) Continuation of application No. 12/971,713, filed on Dec. 17, 2010, now Pat. No. 9,747,601, which is a
(Continued)

(51) Int. Cl.
*G06Q 40/00* (2012.01)
*G06Q 30/00* (2012.01)
(Continued)

(52) U.S. Cl.
CPC ......... *G06Q 30/0185* (2013.01); *G06Q 20/04* (2013.01); *G06Q 20/042* (2013.01);
(Continued)

(58) Field of Classification Search
None
See application file for complete search history.

(56) References Cited

U.S. PATENT DOCUMENTS

| 4,630,201 A | 12/1986 | White |
| 4,958,066 A | 9/1990 | Hedgcoth |

(Continued)

OTHER PUBLICATIONS

Schneier, Bruce, Applied Cryptography, National Institute of Standards and Technology Special Publication 800-63, Electronic Authentication Guideline, 1996, Chapter 11, Mathematical Background, Appendix A, p. 233-237, John Wiley & Sons.

*Primary Examiner* — Olabode Akintola
(74) *Attorney, Agent, or Firm* — Troutman Sanders LLP; Christopher J. Forstner; John A. Morrissett

(57) ABSTRACT

A method for authenticating a check of a plurality of checks where the check was previously issued from a first party to a second party, including receiving first information from the first party, storing the first information in a file of a third party and receiving the check. The check has first party identifying information, a unique pseudorandom number of a pseudorandom sequence, and an amount. A status of activating the plurality of checks is determined. At least a portion of the first party identifying information included with the check, the unique pseudorandom number included with the check and the check amount included with the check are authenticated. The received check is authenticated if the first party, the unique pseudorandom number included with the check and the amount included with the check are authenticated and if the plurality of checks have been activated.

18 Claims, 18 Drawing Sheets

Related U.S. Application Data continuation-in-part of application No. 12/768,876, filed on Apr. 28, 2010, now Pat. No. 8,626,656.

(51) Int. Cl.
    *G06Q 20/04*         (2012.01)
    *G06Q 20/10*         (2012.01)
    *G06Q 20/34*         (2012.01)
    *G06Q 20/40*         (2012.01)

(52) U.S. Cl.
    CPC ......... *G06Q 20/105* (2013.01); *G06Q 20/354* (2013.01); *G06Q 20/40* (2013.01)

(56) References Cited

U.S. PATENT DOCUMENTS

| | | | |
|---|---|---|---|
| 5,491,325 A * | 2/1996 | Huang | G06Q 20/04 235/379 |
| 5,754,653 A | 5/1998 | Canfield | |
| 5,878,337 A | 3/1999 | Joao et al. | |
| 6,064,990 A | 5/2000 | Goldsmith | |
| 6,754,640 B2 | 6/2004 | Bozeman | |
| 7,069,250 B2 * | 6/2006 | Meadow | G06Q 20/04 380/54 |
| 7,389,913 B2 | 6/2008 | Starrs | |
| 7,774,283 B2 | 8/2010 | Das et al. | |
| 2002/0013711 A1 | 1/2002 | Ahuja et al. | |
| 2002/0120846 A1 | 8/2002 | Stewart et al. | |
| 2005/0149439 A1 | 7/2005 | Suisa | |
| 2010/0078471 A1 | 4/2010 | Lin et al. | |

* cited by examiner

Account Maintenance for Checking Account 46992877

Online Check Register

| Amount | Payee Name | Description | Date | Check | Check Code | | |
|---|---|---|---|---|---|---|---|
| $1100.00 | John Smith | | 3/10/2010 | 101 | 32 | Edit | Del. |
| $72.36 | ABC School | PTA Dues | 3/17/2010 | 106 | 9487 | Edit | Del. |
| $137.24 | Fresh Food Store | Groceries | 3/17/2010 | | | Edit | Del. |
| $1917.54 | My Bank | Mortgage Payment | 3/1/2010 | 99 | 5A74 | Edit | Del. |
| $26.60 | Fast Gas | Gas | 3/3/2010 | | | Edit | Del. |
| $275.61 | Super Cars | Car Payment | 3/8/2010 | 100 | 993 | Edit | Del. |

FIG. 12

Electronic Check Deposit

Process Check Transaction Online

To get started processing this electronic check transaction you need to enter some information printed on the check you received from our customer.

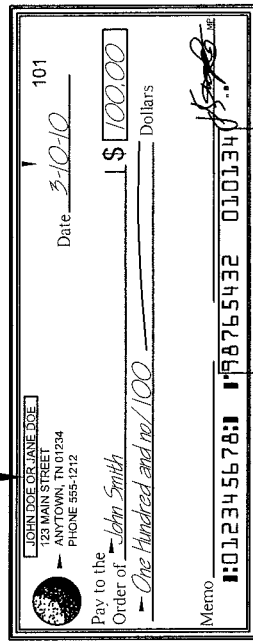

Enter the full name of the customer exactly as it is printed on the top left corner of the check you received Enter the numbers and/or letters as they are printed on the bottom right corner of the check you received Enter the numeric amount of the check

FIG 17

Electronic Check Deposit

Process Check Transaction Online

The check you received has been authenticated. To continue processing this electronic check transaction, we also need information about you and your financial institution.

Enter your full name as it is registered with your financial institution

Enter the account number of the account where you wish the check amount to be deposited Enter the routing transit number (RTN) of your financial institution

FIG. 18

METHOD FOR AUTHENTICATING FINANCIAL INSTRUMENTS AND FINANCIAL TRANSACTION REQUESTS

CROSS REFERENCE TO RELATED APPLICATION

The subject application is a Continuation of U.S. patent application Ser. No. 12/971,713 filed Dec. 17, 2010, which is a Continuation-in-Part of Ser. No. 12/768,876 filed Apr. 28, 2010, now U.S. Pat. No. 8,626,656, the contents of which are hereby incorporated by reference in their entireties.

FIELD OF THE INVENTION

The present disclosure is directed generally to methods for protecting sensitive financial information from theft and fraud. In particular, the present disclosure relates to methods for authenticating the initiation of a financial transaction.

DESCRIPTION OF THE RELATED ART

Safeguarding customer financial information against criminal fraudsters, forgers and cybercriminals represents an ongoing battle for consumers, businesses and financial institutions. Financial fraud can assume many forms including swindling, payment instrument fraud, debit or credit card fraud, real estate fraud, identity theft, deceptive telemarketing, or even money laundering. Personal computers continue to be a favorite target for fraudsters as they are typically poorly protected. Common attacks against consumers include the use of mirror or phishing sites, pharming sites, carding or skimming techniques, and crimeware such as Trojans. Although advancements in computer technology have offered more robust security features to consumers, businesses and financial institutions, they have also offered an easier operating environment for fraudsters to manipulate financial instruments, such as payment instruments, in such a way as to deceive innocent victims expecting value in exchange for their money.

In particular, payment instrument fraud is one of the largest challenges facing businesses, consumers and financial institutions today. Annual losses due to payment instrument fraud are estimated to be in the billions of dollars. This problem affects consumers who face financial losses and anxiety from the instant theft and also from possible future repercussions with credit bureaus. The Uniform Commercial Code has placed increasing emphasis on the role of businesses and financial institutions in ensuring that their issued payment instruments are secure.

Victims of payment instrument fraud include financial institutions, businesses who accept and issue payment instruments, and the consumer. These crimes may begin with the theft of a financial document, for example, the theft of a blank check from a consumer's home or vehicle during a burglary, searching for a canceled or old check in the garbage, or removing a consumer's check from a mailbox. As financial institutions also continue to expand "automated clearing house" (or ACH) activities, the foregoing fraud risks only increase. ACH refers to an electronic clearing and settlement system for exchanging electronic credit and debit transactions among participating depository institutions. These electronic transactions are substitutes for paper checks and are typically used to make recurring payments such as payroll or loan payments. ACH transactions are often available as a way to reload prepaid debit cards issued by many companies.

Common types of payment instrument fraud include forgery where an individual, such as a disgruntled employee of a financial institution or business, issues a check without proper authorization, counterfeiting where a payment instrument may be fabricated as a whole or duplicated, alteration where chemicals are used to remove or modify information on the payment instrument, paperhanging where consumers purposefully write checks on closed accounts, or kiting where a fraudster opens accounts at two or more financial institutions and uses "the float time" of available funds to create fraudulent balances. In particular, payment instrument compilations, such as paper checkbooks, are particularly prone to fraud due to check number guessing and limited controls placed on the physical paper checks within the checkbook.

Conventional systems and methods have utilized transaction specific information, such as a transaction amount or a particular type of transaction, to permit independent verification of a transaction and a payment instrument. For example, U.S. Pat. No. 4,630,201 to White discloses a paper check security feature in which the checks include unique transaction numbers. When a check is cleared, the bank compares the unique transaction number to a stored number to determine if the check number is being duplicated. White further discloses that a password protected portable device generates the transaction numbers. Additionally, U.S. Patent Publication Ser. No. 2005/0149439 to Suisa discloses a paper check security feature in which the checks include unique transaction numbers generated for a particular type of transaction. When a check is cleared, the bank compares the unique transaction number to a stored number to determine if the check number is being duplicated. Further by way of example, U.S. Pat. No. 5,754,653 to Canfield discloses a paper check security feature that uses a security code that is unique for each check and for each transaction involving a check. The security code is generated from the check sequence number preprinted on the check or the total transaction amount and a customer selected base code. Still further, U.S. Pat. No. 4,958,066 to Hedgcoth discloses a checkbook in which each check has a randomly assigned number. The number is used to verify the authenticity of the check by comparing it to digits on the payor's ATM card or separate dedicated, disposable card, but is not compared to a stored bank number during check clearing.

In U.S. Pat. No. 6,754,640, to Bozeman, a system is disclosed for a customer to enter current check register information via an interface such as a PC or PDA, and that a financial institution, intermediary, clearing house can match and compare the information from a check to the information in the check register. If the check has been altered in any way, then the transaction is stopped. The system notifies each of the parties when a check has been rejected or when a deposit has occurred. Electronic check processing and electronic check registering is disclosed that allows checks to be deposited and cleared in a wide variety of ways, including ACH.

In U.S. Patent Pub. No. 20100078471 to Lin et al., discloses peer-to-peer financial transactions using one or more electronic devices such as a mobile device. The device includes one or more input interfaces, including a camera, image processing software, and communication interfaces to retrieve transaction information from a payment instrument, such as a check, transmit payment information to a financial server and/or another electronic device or conduct a transaction. Lin et al., also disclose using a partial image of the check. A notification message is provided on the screen of the mobile device including information regarding the transaction, such as the depositing of a requested payment amount.

U.S. Pat. No. 7,774,283, issued to Das et al., discloses a system for a mobile device, including a camera, to capture an image of a bar code on a "printed medium", decodes the transaction information and identification information for a business entity contained in the bar code and communicates the transaction information to the business entity that is identified in the bar code to conduct the transaction.

U.S. Pat. No. 7,389,913, issued to Starrs, discloses a system for a customer to provide online and/or electronically, such as via a graphical user interface, check information for a transaction. Starrs suggests that the check information is used by a financial institution to create an electronic image of an authorized demand check to provide funds to a third party (bank, retailer, etc. . . . ) via wire or a paper check.

U.S. Patent Pub. No. 20020120846 to Stewart, et al., discloses an electronic check payment system designed to facilitate network transactions, e.g., via the Internet. In the system, a consumer enters identifying information and check information, including MICR information, into a payment portal. The financial institution or merchant's server receives the electronic check information via the Internet and transfers this check information to an authorization server. The authorization server verifies the identity of the consumer, does a risk analysis, sends an acceptance or declination message back to the merchant server and sends the check information to an ACH. The deposit is then processed as an ACH transfer.

U.S. Pat. No. 6,064,990, issued to Goldsmith, discloses a system for notifying a user of account activity, such as a withdrawal from a savings or checking account. The system maintains information on financial accounts and customer contact information for a financial account of the customer. Information on a transaction with respect to the customer's financial account is received and processed. The system processes the information on the transaction and generates a message, e.g., bye-mail, page, or phone call, providing information on the transaction, retrieves the user contact information for the financial account involved in the transaction and transmits the notification message to the location identified by the user contact information for the financial account. Goldsmith discloses the notification may include transaction-related information.

U.S. Patent Pub. No. 20020013711 to Ahuja et al., discloses a customer being provided with access to a notification or alert system, that an "event" which is selected by the customer is received and stored in a database following its selection, that "trigger" data from a separate database, including a database containing customer financial information, is received which triggers the selected event, and that the customer is notified of the triggering of the event via a "notification message" (i.e. alert). Possible triggers include specific credit charges (e.g., single amount charges, location charges), direct deposits, check clearing alert and ATM withdrawals. The customer is asked to select a "method of notification" and the customer's selected notification method is stored in a database. The "notification message" is sent to the customer via the customer's selected notification method.

U.S. Pat. No. 5,878,337, issued to Joao discloses a system that receives information regarding a financial transaction and transmits a notification to a "communication device" of the customer (such as a cell phone or PDA of the customer) such that the notification serves as an alert to notify the customer of the financial transaction. The information and/or data transmitted to the communication device may include information and/or data identifying the transaction, such as the amount, time, location of the transaction, contact information for the customer to respond in order to authorize or cancel the transaction, the type of goods and/or services involved in the transaction. Joao discloses that this information may be displayed to the customer on the communication device. Joao also discloses that the system may wait for the customer to respond to the transmission, and/or may permit the customer to approve, or authorize, the transaction or to disapprove, or void the transaction.

Conventional technologies instituted by financial institutions to minimize fraud and secure financial information have also included implementing procedures to actively monitor for customer check sequence numbers that are used out of sequence. Additionally, some financial institutions have established policies to only process check sequence numbers that they know have been sent to a consumer. However, there remains a need in the art to overcome conventional limitations and provide a novel system and method for securing payment instruments, such as checks, with improved security and fraud protection capability.

SUMMARY OF THE INVENTION

One embodiment of the present invention provides a method for authenticating a check where the check is one of a plurality of checks and where the check was previously issued from a first party to a second party, including receiving first information from the first party. The first information includes an amount of the check and information for identifying the check. The first information is stored in a file of a third party. The check having information for identifying the first party, a unique pseudorandom number of a pseudorandom sequence, and an amount, included with the check is received. A status of activating the plurality of checks is determined using at least a portion of the information for identifying the first party included with the check, a stored activation code, and stored information for identifying the first party. The stored information for identifying the first party is stored with the pseudorandom sequence. The at least a portion of the information for identifying the first party included with the check is authenticated with the stored information for identifying the first party. The unique pseudorandom number included with the check is authenticated using at least a portion of the information for identifying the first party included with the check, the stored information for identifying the first party and the stored sequence. The amount included with the check is authenticated using the stored first information. The received check is authenticated if (i) the first party, (ii) the unique pseudorandom number included with the check and (iii) the amount included with the check are authenticated and (iv) if the plurality of checks have been activated.

Another embodiment of the present invention provides a method for authenticating a financial transaction request where the financial transaction request is representative of a check and where the check was previously issued from a first party to a second party, including providing a first computer processor at a third party. The first computer processor has a computer readable storage medium. The computer readable storage medium includes instructions stored therein for executing on the processor. The instructions when read and executed are for receiving first information from the first party. The first information includes a check amount and information for identifying the check. The first information is stored in a file of the third party. Second information including information for identifying the first party, a unique pseudorandom number of the check, and the check amount is received. The unique pseudorandom number of the check includes a pseudorandom number of a pseudorandom number sequence associated with a plurality of checks. A status of activating the plurality of checks is determined using at least a portion of the information for identifying the first party included with the second information, a stored activation code, and stored information for identifying the first party. The stored information for identifying the first party is stored with the pseudorandom sequence. The at least a portion of the information for identifying the first party included with the second information is authenticated with stored information for identifying the first party. The unique pseudorandom number included with the second information is authenticated using at least a portion of the information for identifying the first party included with the second information, the stored information for identifying the first party and the stored sequence. The amount included with the second information is authenticated using the stored first information. The second information is authenticated if (i) the at least a portion of the information for identifying the first party included with the second information, (ii) the unique pseudorandom number included with the second information and (iii) the amount included with the second information are authenticated and (iv) if the plurality of checks have been activated.

These embodiments and many other objects and advantages thereof will be readily apparent to one skilled in the art to which the invention pertains from a perusal of the claims, the appended drawings, and the following detailed description of the embodiments.

BRIEF DESCRIPTION OF THE DRAWINGS

Various aspects of the present disclosure will be or become apparent to one with skill in the art by reference to the following detailed description when considered in connection with the accompanying exemplary non-limiting embodiments. In the Figures like elements have been given like numerical designations to facilitate an understanding of the present invention.

FIG. 12 is an illustrative website screenshot according to an embodiment of the present disclosure.

FIG. 17 is an illustrative website screenshot according to an embodiment of the present disclosure.

FIG. 18 is an illustrative website screenshot according to an embodiment of the present disclosure.

DETAILED DESCRIPTION OF THE EMBODIMENTS OF THE INVENTION

The present disclosure may be utilized to secure financial information in payment instruments provided to customers of financial institutions. A financial institution may be, but is not limited to, a bank or other similar entity. The present disclosure may utilize a computer-based system and method that provides financial institution customers access to numerous online banking services offered by online banking service providers based on customer information profiles that may be developed over time. "Online" may mean connecting to or accessing account information from a location remote from the financial institution or a branch of the financial institution. Alternatively, "online" may refer to connecting or accessing an electronic network (wired or wireless) via a computer as described below. In exemplary embodiments, the methods are often web-based.

The Internet is a worldwide system of computer networks—a network of networks in which a user at one computer or other device connected to the network can obtain information from any other computer and communicate with users of other computers or devices. The most widely used part of the Internet is the World Wide Web (often-abbreviated "WWW" or called "the Web").

One of the most outstanding features of the Web is its use of hypertext, which is a method for cross-referencing. In most Web sites, certain words or phrases appear in text of a different color than the surrounding text. This text is often also underlined. Sometimes, there are hot spots, such as buttons, images, or portions of images that are "clickable." Clicking on hypertext or a hot spot causes the downloading of another web page via a protocol such as hypertext transport protocol (HTTP). Using the Web provides access to millions of pages of information. Web "surfing" is done with a Web browser, the most popular of which presently are Apple Safari and Microsoft Internet Explorer. The appearance of a particular website may vary slightly depending on the particular browser used. Versions of browsers have "plug-ins," which provide animation, virtual reality, sound, and music. Interpreted programs (e.g., applets) may be run within the browser.

Figure 1:
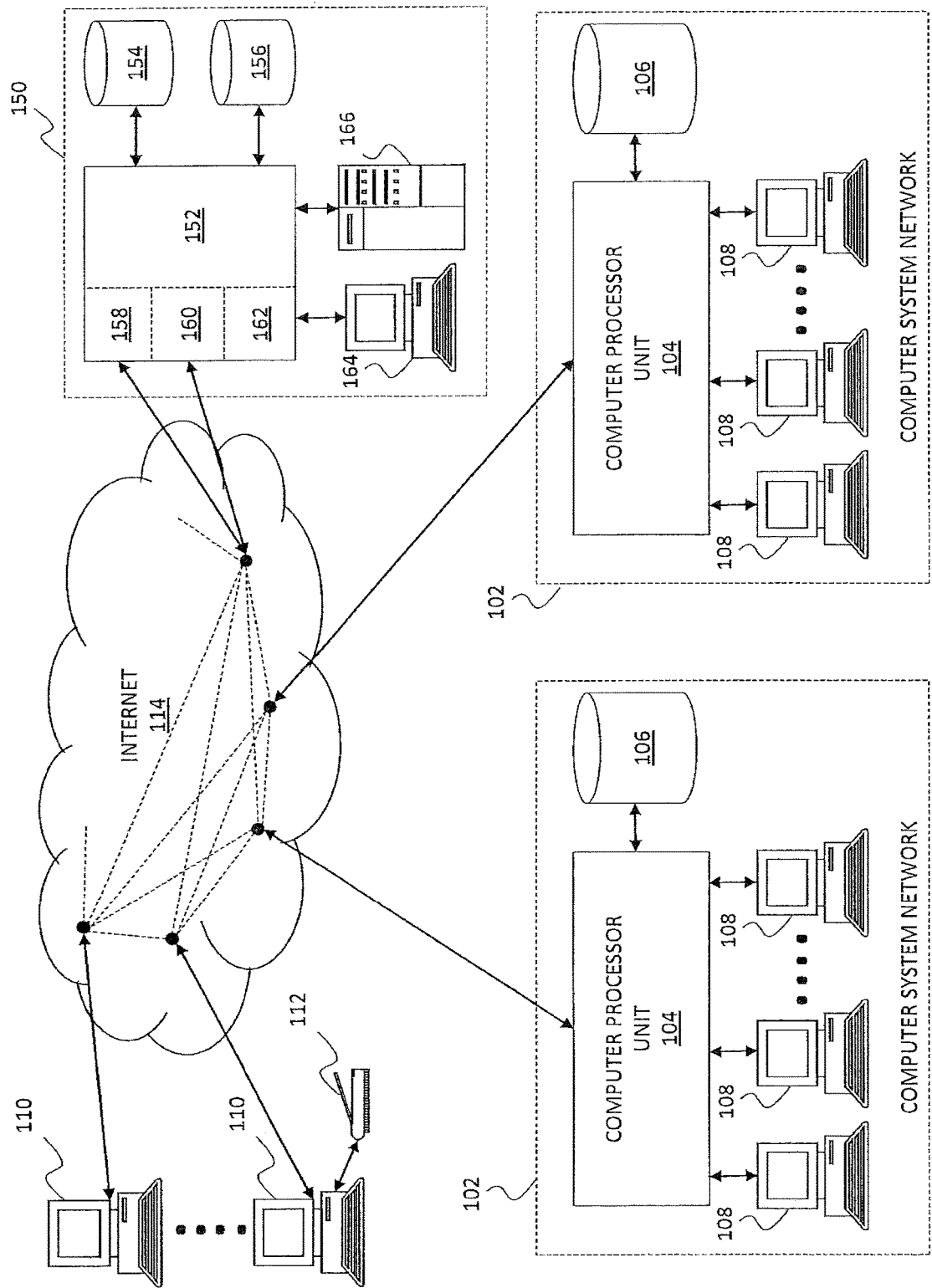
FIG. 1 is a diagram of an online banking access system connected to a plurality of interconnected computer system networks and devices according to an embodiment of the present disclosure.

FIG. 1 shows an online banking access system 150 connected to a plurality of interconnected computer system networks 102 and devices 110. Each computer system network 102 may include a corresponding local computer processor unit 104, which is coupled to a corresponding local data storage unit 106 and to local network user terminals 108. A computer system network 102 may be a local area network (LAN) or part of a wide area network (WAN), for example. The online banking access system 150 and local computer processor units 104 are selectively coupled to a plurality of user devices 110 through Internet 114. Each of the plurality of user devices 110 and local user terminals 108 (collectively, user terminals) may have various devices connected to their local computer systems, such as scanners, barcode readers, printers, finger print scanners, mouse devices, keyboards, and other interface devices 112.

Online banking access system 150 includes a processing unit 152 coupled to one or more data storage units 154, 156. The processing unit 152 provides front-end graphical user interfaces (GUI), e.g., customer GUI 158 and online banking service provider GUI 160, as well as back-end GUIs 162 to a user's terminal 108, 110 or to local computer 164. The GUIs can take the form of, for example, a webpage that is displayed using a browser program local to the user terminal 108, 110, or to local computer 164. It is understood that the online banking access system 150 may be implemented on one or more computers 164, servers 166, or like devices. Front-end and back-end GUIs 158, 160, 162 are preferably portal pages that include various content retrieved from the one or more data storage devices 154, 156. As used herein, "portal" is not limited to general-purpose Internet portals, such as YAHOO! or GOOGLE but also includes GUIs that are of interest to specific, limited audiences and that provide the user access to a plurality of different kinds of related or unrelated information, links and tools as described below. "Webpage" and "website" may be used interchangeably herein.

A user may gain access to online banking access system 150 by using a user device 108, 110, 164, programmed with a Web browser or other software, to locate and select (such as by clicking with a mouse) a particular webpage. The content of the webpage is located on the one or more data storage devices 154, 156. The user devices 108, 110 may be microprocessor-based computer terminals, pagers that can communicate through the Internet using the Internet Protocol (IP), Kiosks with Internet access, connected personal digital assistants or PDAs (e.g., a PALM device manufactured by Palm, Inc., IPAQ device available from Compaq, iPHONE from Apple or BLACKBERRY from RIM), or other devices capable of interactive network communications, such as an electronic personal planner. User devices 108, 110 may also be wireless devices, such as a hand-held unit (e.g., a cellular telephone or a portable music player such as an iPod) that connect to, and communicate through, the Internet using a wireless access protocol (WAP).

The methods of the present invention may be implemented by utilizing at least a part of the system 150. The functionality of the method may be programmed and executed by at least one computer processor unit 152, with necessary data and graphical interface pages as described below stored in and retrieved from a data storage unit 154, 156. A user can access this functionality using a user device 108, 110. Online banking access system 150 may provide separate features and functionality for front-end users, including customers and online banking service provider users, as well as back-end users that manage the online banking access system 150. As used herein, a "customer" is an individual or organization that signs up for or otherwise takes advantage of an online banking service, and an "online banking service provider" is an individual or organization, such as a financial institution, that provides one or more online banking services to customers. Accordingly, the customers are actual customers of the online banking service providers.

Figure 2:
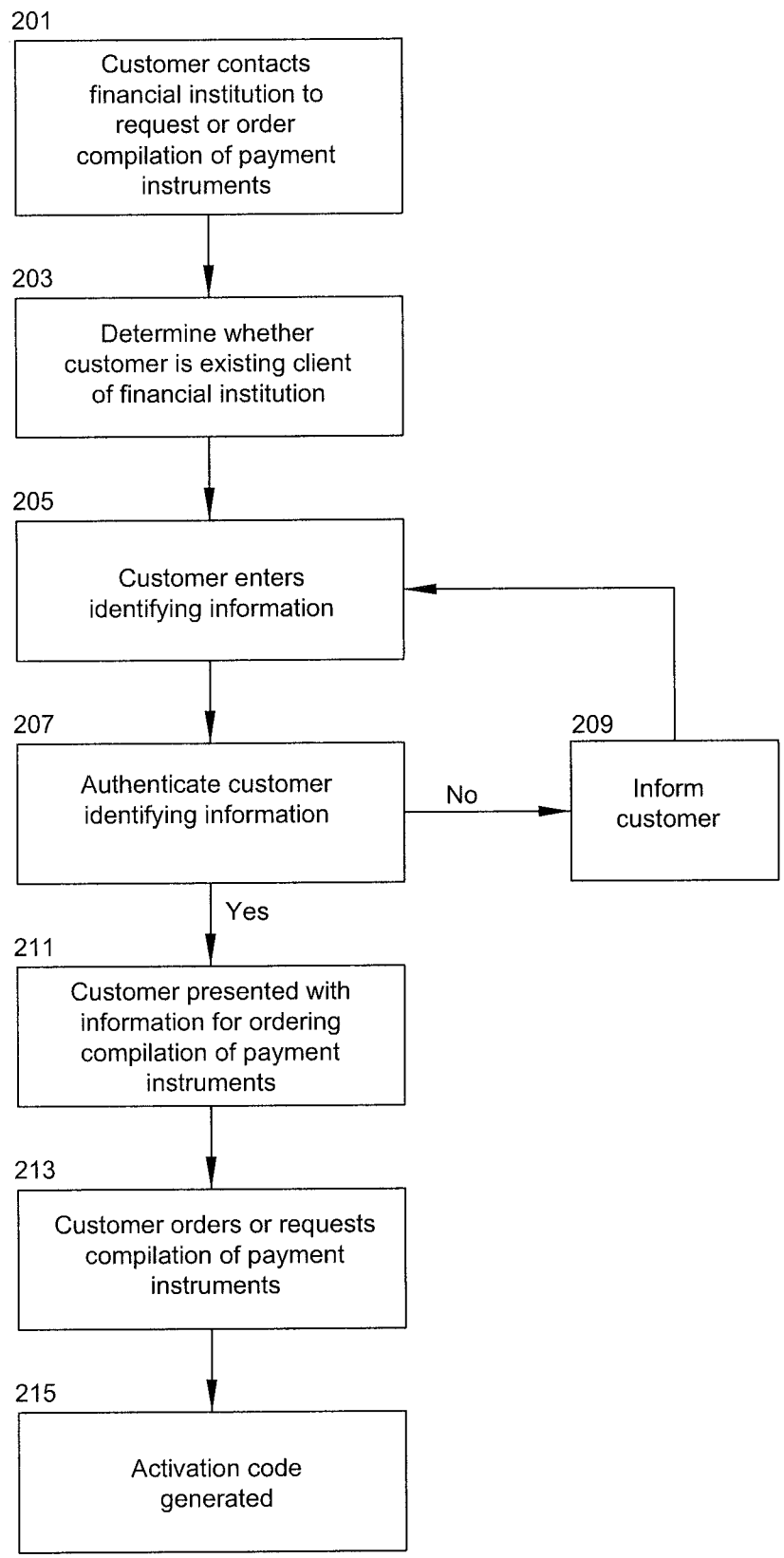
FIG. 2 is a flow chart of for a method for securing financial information according to an embodiment of the disclosure.

Referring to FIG. 2, and flow diagram 200, at block 201 a customer may contact a financial institution to request or order a compilation of payment instruments, such as a checkbook, from the financial institution. For example, the checkbook may be a paper checkbook or an electronic checkbook. As can readily be appreciated, the present disclosure is applicable to a number of payment instruments and compilations of payment instruments, and that a check and compilation of a plurality of checks commonly referred to as a checkbook are only an exemplary form of a payment instrument or a compilation of payment instruments that are contemplated by the present invention.

The customer may order a checkbook by contacting the financial institution through a wide variety of methods including, but not limited to, telephone, mobile telephone, SMS, electronic mail, physical mail or by entering the financial institution's electronic system for online check ordering. The financial institution's electronic system for online check ordering may be a website provided by the financial institution's online banking access system 150 that the customer may access via a public or private network. The customer may enter the website a number of ways (i.e., the customer's entrance into the financial institution's website may be "path sensitive") such as via a public network, via a link from another account the customer may have with the financial institution, via a notice or alert sent to the customer by the financial institution, via an e-mail advertisement sent to the customer by the financial institution, in response to a receipt of a promotional advertisement, etc.

At block 203, a determination may be made as to whether the customer is an existing client of the financial institution. In one embodiment, a determination may be made as to whether the customer is an existing online client of the financial institution. This determination may be based on information from block 201 or other information provided by the customer or from another source, including records or files possessed by, or stored at, the financial institution, including, but not limited to, at data storage units 154, 156. The determination at block 203 may be made as to whether the customer is an existing offline client of the financial institution or both an online and offline client of the financial institution. An offline client may include the situation where the customer currently does business with the financial institution but not through the financial institution's online system.

If the customer is an existing online client of the financial institution, then at block 205, the customer enters information (which may sometimes be referred to herein as information for identifying a party or information for identifying a customer) such as, for example, a username and password. This information may typically be entered and transmitted to the financial institution using a computer such as, for example, through customer's terminal 108, 110 or local computer 164. Alternatively, other information may be entered or used in place of a username and password. For example, the information for identifying a customer may include the customer's name, the customer's mailing address, the customer's electronic mailing address, the customer's account number, the customer's social security number, the customer's bank's name, the customer's bank's identification number, the customer's bank's routing transit number, the website login information assigned to the customer by the financial institution or selected by the customer when creating an online account with the financial institution, a digital signature, information stored in a security token such as a soft token, hard token, key fob, or the like, a personal identification number (PIN), source IP address, a session identification, a session start time, a knowledge based authentication (KBA) status or any combination thereof. In one embodiment, since the customer is an existing online client of the financial institution only a limited amount or portion of information need be entered by the customer. In an exemplary embodiment, the information sent between the customer and the financial institution is encrypted using a network security protocol known in the art such as, for example, Secure Socket Layer (SSL) or Transport Layer Security (TLS). If the customer is an existing offline client of the institution, the customer provides identifying information, at block 205, such as, for example, the customer's name, customer's mailing address, the customer's electronic mailing address, the customer's account number, the customer's social security number, the customer's bank's name, the customer's bank identification number, the customer's bank's routing transit number, telephone call-in information assigned to the customer by the financial institution or selected by the customer during account set-up, a call-in password, a call-in PIN, or any combination thereof. In another embodiment, when the customer is an existing offline client of the financial institution, only a limited amount or portion of information need be entered by the customer.

At block 207, the information provided by the customer at block 205 may be authenticated by any appropriate method known in the art. For example, the information provided by the customer at block 205 may be compared to information stored for the customer in records or files possessed by, or stored at, the financial institution, including, but not limited to, at data storage units 154, 156. If the information provided by the customer at block 205 is not authenticated, the financial institution may inform the customer that the information provided at block 205 is incorrect by any appropriate method known in the art including, for example, by displaying an error message on the customer's computer screen at block 209 and looping the process back to block 205. If the information provided by the customer at block 205 is authenticated, then the financial institution may, at block 211, present to the customer (e.g. by displaying information on a webpage presented to the customer) at, for example, the customer's terminal 108, 110 or local computer 164, information for ordering a compilation of payment instruments. In one embodiment, the financial institution may provide to the customer, at block 211, information for ordering a checkbook by telephone, electronic mail, mobile telephone, SMS, physical mail, or any other correspondence mechanism.

The information for ordering a checkbook presented to the customer at block 211 may be dynamically presented based at least partially on the information provided by the customer at block 201 or 205 or from another source, including records or files possessed by, or stored at, the financial institution, including, but not limited to, at data storage units 154, 156. For example, the information for ordering the checkbook may include a type of account held by the customer at the financial institution including, but not limited to, a savings account, checking account, money market account, etc. In one embodiment, the information for ordering the checkbook may include the name of the primary account holder, the name of a joint account holder, an account number of a checking, savings, money market or other account, a physical or electronic mailing address of the customer, terms and conditions for ordering the checkbook, etc. The terms and conditions, as is known in the art, typically includes information appropriate for a product to be selected or ordered by a customer, in this case at block 211, and may include information, such as, but not limited to, minimum balance requirements, payment rules, interest rates charged, overdraft charges, late fee applicability, etc. In an embodiment, the information for ordering the checks may include an option for renewal of a previous order or request made by the customer. In another embodiment, the customer may be asked to verify the accuracy of the information presented at block 211 and/or accept terms and conditions presented at block 211 prior to ordering or requesting the checkbook. In a further embodiment, the customer may perform edits to the information presented at block 211 to ensure accuracy. In another embodiment, the information for ordering the checkbook may include a link to a third party provider site, including but not limited to, a check provider or check printing service provider. At block 213, the customer makes a selection from the information for ordering the checkbook provided or presented at block 211 and orders or requests the checkbook.

Upon receipt of the request or order from the customer, at block 215, an activation code is generated by the financial institution. As used herein, an activation code is a random or pseudorandom code generated by any appropriate method known in the art, including at least one or more of a number, letter or symbol, or combination thereof, and that is unique to the checkbook ordered or requested by the customer at block 213. In one embodiment of the invention, computer processing unit 152 may be programmed to execute an activation code generating algorithm that returns a sequence of apparently non-related numbers, letters, symbols or combinations thereof each time the program is called. For example, an activation code for a requested checkbook may be generated as "e429ab." In an alternate embodiment, the activation code may be generated by a third party check provider or check printing service provider.

Figure 3:
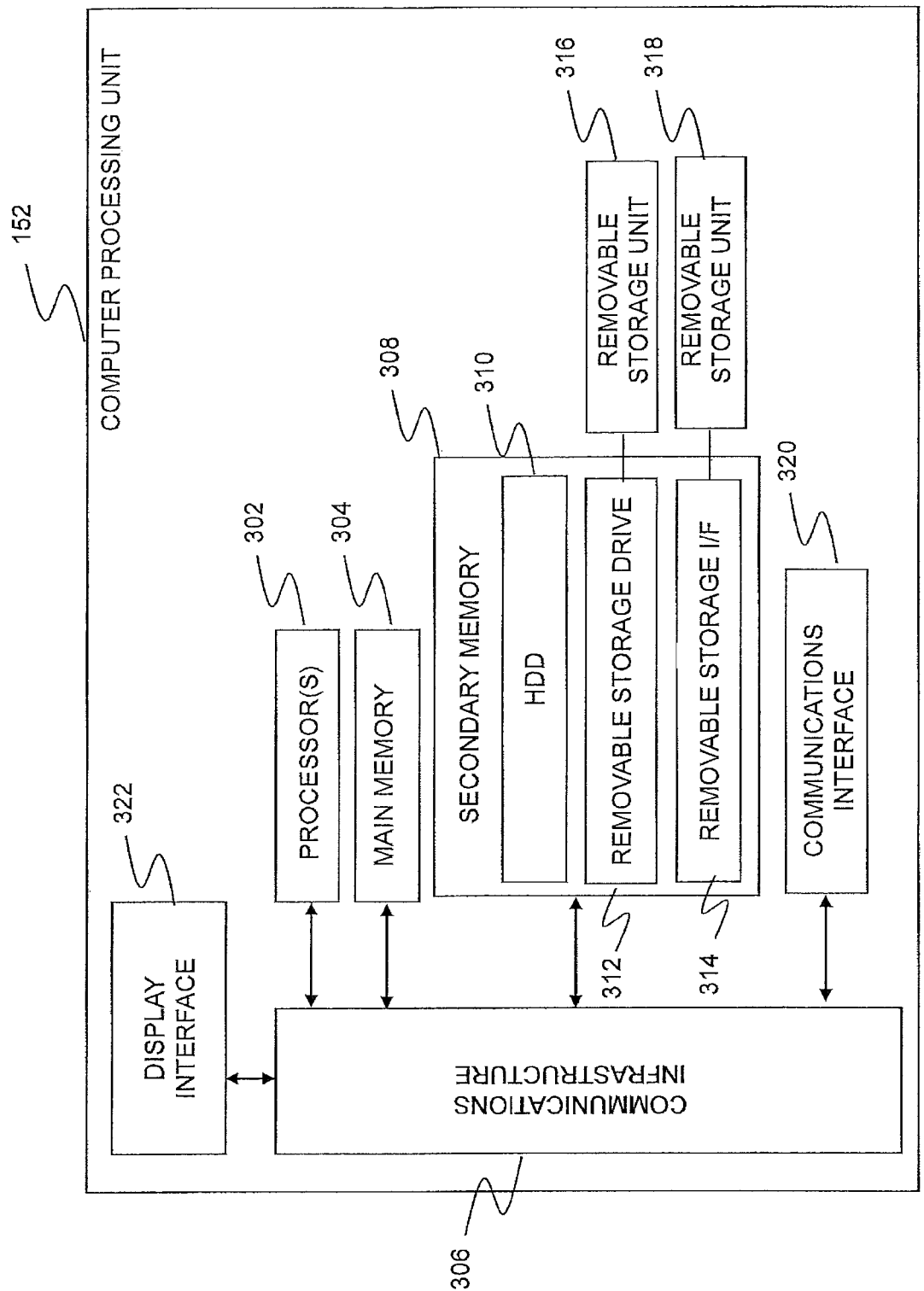
FIG. 3 is a diagram of an illustrative example of an architecture of a computer processing unit with the present invention.

Referring to FIG. 3, computer processing unit 152 may be configured to implement the algorithms associated with the present disclosure by including one or more processors 302. The processor 302 is connected to a communication infrastructure 306 (e.g., a communications bus, cross-over bar, or network). Computer processing unit 152 may include a display interface 422 that forwards graphics, text, and other data from the communication infrastructure 406 (or from a frame buffer not shown) for display on the front- and back-end GUIs 158, 160, 162 and as retrieved from the one or more data storage devices 154, 156.

Computer processing unit 152 may also include a main memory 304, such as a random access memory (RAM), and a secondary memory 308. The secondary memory 308 may include, for example, a hard disk drive (HDD) 310 and/or removable storage drive 312, which may represent a floppy disk drive, a magnetic tape drive, an optical disk drive, or the like. The removable storage drive 312 reads from and/or writes to a removable storage unit 316. Removable storage unit 316 may be a floppy disk, magnetic tape, optical disk, or the like. In some instances, the removable storage unit 316 may include a computer readable storage medium having stored therein computer software and/or data. In alternative embodiments, secondary memory 308 may include other similar devices for allowing computer programs or other instructions to be loaded into computer processing unit 152. Secondary memory 308 may include a removable storage unit 318 and a corresponding interface 314. Examples of such removable storage units include, but are not limited to, USB or flash drives, which allow software and data to be transferred from the removable storage unit 318 to computer processing unit 152.

Computer processing unit 152 may also include a communications interface 320. Communications interface 320 allows software and data to be transferred between computer processing unit 152 and external devices. Examples of communications interface 320 may include a modem, Ethernet card, wireless network card, a Personal Computer Memory Card International Association (PCMCIA) slot and card, or the like. Software and data transferred via communications interface 320 may be in the form of signals, which may be electronic, electromagnetic, optical, or the like that are capable of being received by communications interface 320. These signals may be provided to communications interface 320 via a communications path (e.g., channel), which may be implemented using wire, cable, fiber optics, a telephone line, a cellular link, a radio frequency (RF) link and other communication channels.

In connection with many of the methods of the present invention, the terms "computer program medium" and "computer readable storage medium" refer to media such as removable storage drive 312, or a hard disk installed in hard disk drive 310. These computer program products may provide software to computer processing unit 152. Computer programs (also referred to as computer control logic) are stored in main memory 304, secondary memory 308 and/or data storage devices 154, 156. Computer programs may also be received via communications interface 320. Such computer programs, when executed by a processor, enable the computer processing unit 152 to perform features of the methods discussed herein. For example, main memory 304, secondary memory 308, data storage devices 154, 156 or removable storage units 316 or 318 may be encoded with computer program code for performing the activation code algorithm.

In an embodiment implemented using software, the software may be stored in a computer program product and loaded into computer processing unit 152 using removable storage drive 312, hard drive 310, or communications interface 320. The software, when executed by a processor 302, causes the processor 302 to perform the functions of the activation code algorithm described herein. In another embodiment, the activation code algorithm may be implemented primarily in hardware using, for example, hardware components such as a digital signal processor comprising application specific integrated circuits (ASICs). In yet another embodiment, the activation code algorithm is implemented using a combination of both hardware and software.

As discussed above, at block 215, the financial institution may generate an activation code by any appropriate method known or used in the art. For example, it is well-known in the art to program and execute a standard C RAND or RAND_S function, or the PHP hypertext preprocessor functions microtime or mt_rand, or the Unix function /dev/random, or the Java function SecureRandom, to return a pseudorandom number or alphanumeric sequence within a specified range. It is understood that a pseudorandom number or alphanumeric sequence generator should produce a pseudorandom sequence with a period that is long enough so that a finite sequence of reasonable length is not periodic. It is also well known that all pseudorandom number or alphanumeric sequence generators have an internal memory or state and that the size of the state is the value that determines the strength of the pseudorandom number or alphanumeric sequence generator, where an n-bit state can produce at most $2^n$ different values. The strength, or ability of the pseudorandom sequence generator to resist a brute force attack by a cryptanalyst, of the output of the pseudorandom number or alphanumeric sequence generator is also commonly associated with the information entropy of the process that produced the pseudorandom sequence. This information entropy (H) is conventionally measured in bits and is commonly calculated as: $H=L \log_2 N$ where L is the number of letters, numbers or symbols in the sequence and N is the number of possible letters, numbers or symbols. See, e.g. National Institute of Standards and Technology Special Publication 800-63, Electronic Authentication Guideline, Appendix A; Bruce Schneier, Applied Cryptography, John Wiley & Sons, 1996, Chapter 11, Mathematical Background, p. 233-237. For example, in a pseudorandom alphanumeric sequence, where each alphanumeric character in the sequence is produced independently, and where the number of possible letters, numbers or symbols includes all letters in the Latin alphabet from a-z (26), A-Z (26) and all Arabic numerals from 0-9 (10), the entropy per symbol would be calculated as $H=\log_2 N$ or $\log_2 (52)$ or 5.70 bits per symbol. It is well known in the art to select L and N based on a desired information entropy, thus, one skilled in the art would understand to select those values for the activation code based on a desired information entropy.

It is also understood that to be cryptographically secure, a pseudorandom sequence must be unpredictable where a secret key, or seed, is used to set the initial state of the pseudorandom sequence generator. Key management of the secret key or seed may be implemented by the financial institution in any method known in the art and should be at least in compliance with the financial industry standards set forth by the Accredited Standards Committee X9. In addition to employing a secret key, there are a wide variety of known methods to generate the seed for pseudorandom sequence generation. For example, the standard C function RAND may be seeded using the time function, although time of day is often not used as a seed due to its susceptibility to cryptographic attacks. Additionally, by way of example, Open SSL may use the function RAND_screen( ) to hash the contents of the screen to generate a seed. Further by way of example, the Linux random number generator may collect data from a variety of sources, including mouse, keyboard and other interrupts to seed a random number generator. Furthermore, it is well known in the art to combine the seed and a counter output and hash the output with a one-way hashing functions such as MD5 or SHA-1 to generate a cryptographically secure pseudorandom sequence.

In an embodiment, at block 215, a third party check provider or check printing service provider may generate an activation code for the customer requested checkbook at block 213. It is understood that the financial institution and third party check provider or check printing service provider should use identical activation code algorithms, identical pseudorandom sequence generators in synchronism and an identical initiating seed previously supplied in advance of the activation code generation. In one embodiment, the activation codes generated by the financial institution and third party check provider or check printing service provider may be verified by any secure communication method known in the art including secure communication methods employing asymmetric or symmetric encryption techniques, message authentication codes, secure hashing algorithms, and/or, as discussed above, a combination thereof using, for example, a network security protocol known in the art such as SSL or TLS where the information sent between the financial institution and third party check provider or check printing service provider is encrypted. In an alternate embodiment, a third party check provider or check printing service provider may generate the activation code for the customer requested checkbook at block 213.

Figure 4:
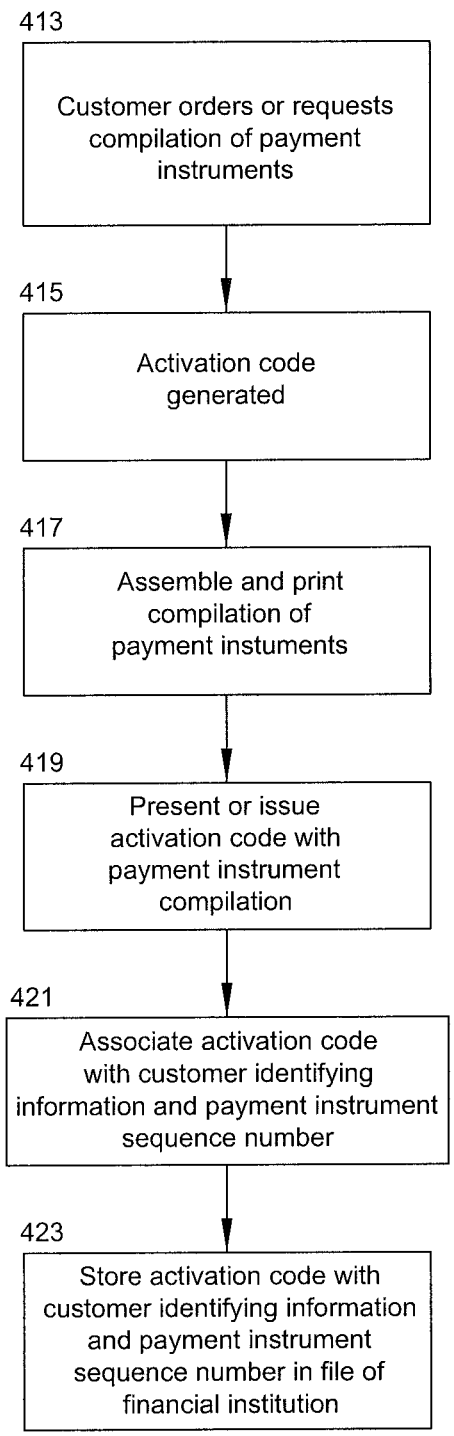
FIG. 4 is a flow chart illustrating a method for securing payment instruments according to an embodiment of the present invention.

FIG. 4 illustrates a flow chart illustrating a method for securing payment instruments according to an embodiment of the present invention. In the present embodiment and as discussed above, the customer may order or request a checkbook at block 213. Upon receipt of the request or order from the customer, at block 215, an activation code is generated by the financial institution using any appropriate method known or used in the art. As discussed above, in an alternate embodiment, the activation code, or an identical activation code, may be generated by a third party check provider or check printing service provider. At block 417, in embodiments including a compilation of paper payment instruments, such as a paper checkbook, each of the plurality of paper checks in the checkbook is printed, assembled and united into a booklet form by the financial institution, third party check provider or third party check printing service provider as requested by the customer at block 213. In embodiments including a compilation of electronic financial instruments, such as an electronic checkbook, each of the plurality of electronic checks is created, electronically assembled and electronically united into an electronic checkbook file by the financial institution or third party check provider at block 417, as requested by the customer at block 213.

In an embodiment, at block 419, the activation code is issued to an address of the customer stored or possessed by the financial institution at, for example, records or files at data storage units 154, 156. The address of the customer may include, but is not limited to, a physical mailing address or electronic mailing address. In one embodiment, the customer may be requested to verify the physical mailing address or electronic mailing address that is stored or possessed by the financial institution prior to requesting or ordering a checkbook at block 213. In an exemplary embodiment using a paper checkbook, at block 419, the activation code may be mailed, with the printed checkbook that was ordered by the customer at block 213, to an address of the customer stored by the financial institution, a third party check provider, or a third party check printing service provider. The activation code may be printed on a card or a sticker with instructions to the customer such as, for example, "Use the below code to activate your checkbook". The card or sticker may also include instructions for contacting the financial institution to activate the checkbook including, but not limited to, a website address, secure electronic mailing address, or telephone number, and may also include instructions for activating the checkbook once contact has been established with the financial institution.

Figure 5:
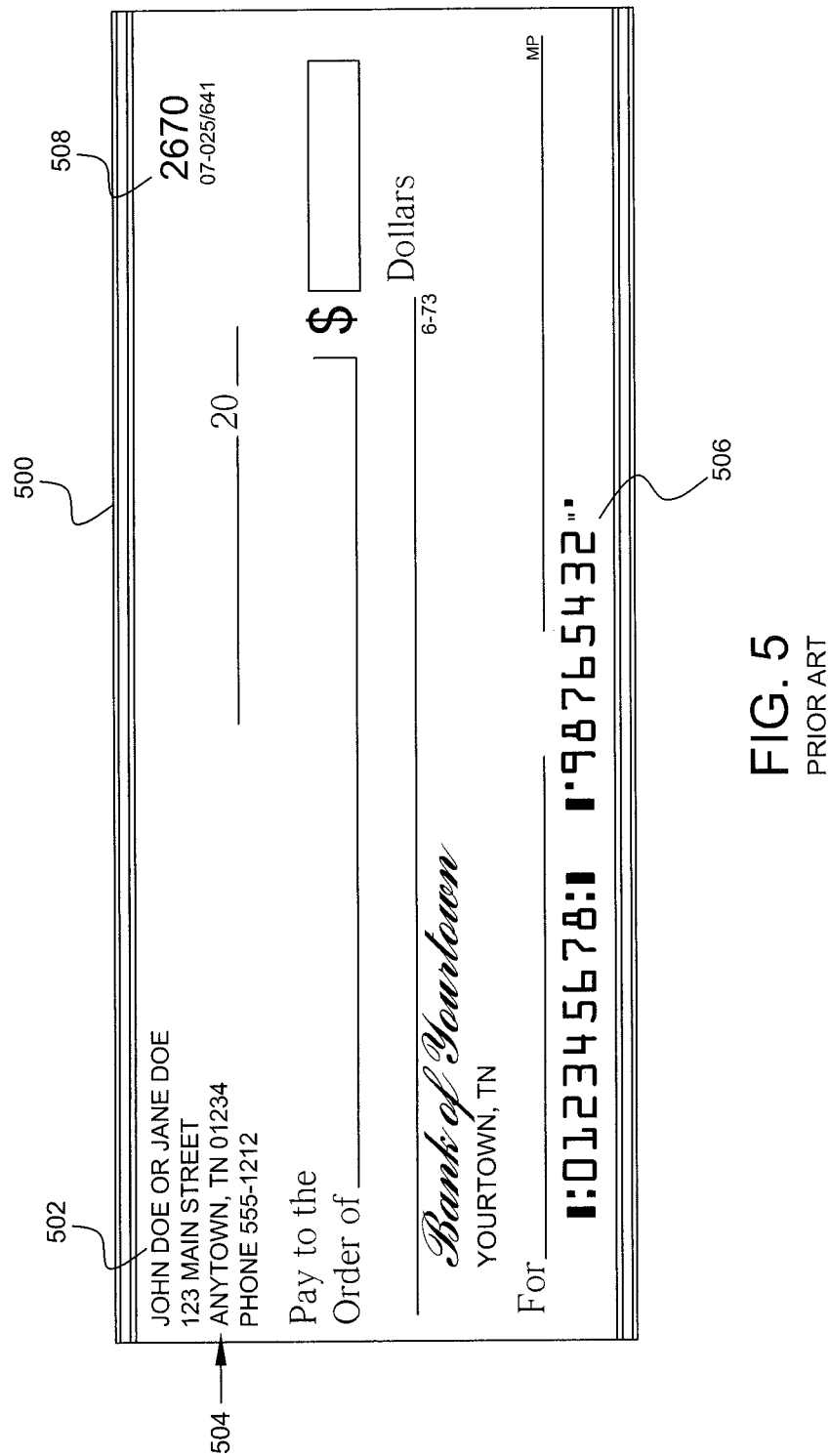
FIG. 5 is a diagram of a conventional paper check.

At block 421, the activation code generated for the customer's checkbook at block 215 is associated with at least a portion of the standard indicia, for example, the traditional check sequence number, for each of the plurality of checks in the checkbook ordered by the customer at block 213. With reference to FIG. 5, standard indicia on a conventional paper check 500 include a customer name 502, a customer address 504, a customer account number 506 printed on the check in traditional Magnetic Ink Character Recognition (MICR) format, and a check sequence number 508. As discussed above, the generated activation code is unique to the plurality of checks in the checkbook ordered by the customer at block 213. In one embodiment, at block 421, the activation code is associated with the traditional check sequence number for each of the plurality of checks in the customer's checkbook ordered by the customer at block 213. At block 421, the activation code generated for the customer's checkbook at block 215 may be associated with identifying information for the customer. The identifying information for the customer may be stored in records or files possessed by, or stored at, the financial institution, including, but not limited to, at data storage units 154, 156. In another embodiment, the customer's identifying information may be stored in records or files possessed by, or stored at, a third party check provider or third party check printing service provider.

The stored customer identifying information may be based upon whether the customer is an existing offline customer or existing online customer of the financial institution. Customer identifying information may include, but is not limited to, a username, a password, the customer's name, the customer's mailing address, the customer's electronic mailing address, the customer's account number, the customer's social security number, the customer's bank's name, the customer's bank's identification number, the customer's bank's routing transit number, the website login information assigned to the customer by the financial institution or selected by the customer when creating an online account with the financial institution, a digital signature, information stored in a security token such as a soft token, hard token, key fob, or the like, a personal identification number (PIN), source IP address, a session identification, a session start time, a knowledge based authentication (KBA) status, telephone call-in information assigned to the customer by the financial institution or selected by the customer during account set-up, a call-in password, a call-in PIN, or any combination thereof.

At block 423, the generated activation code may be stored in the appropriate customer's records or files possessed by, or stored at, the financial institution, including, but not limited to, at data storage units 154, 156 with at least a portion of the customer identifying information and at least a portion of the standard indicia, for example, the traditional check sequence number, for each of the plurality of checks in the checkbook ordered by the customer at block 213. In another embodiment, at block 423, the activation code, at least a portion of the customer identifying information and at least a portion of the standard indicia, for example, the traditional check sequence number, for each of the plurality of checks in the checkbook ordered by the customer at block 213, may be stored in the appropriate customer's records or files possessed by, or stored at, a third party check provider or third party check printing service provider.

Figure 6:
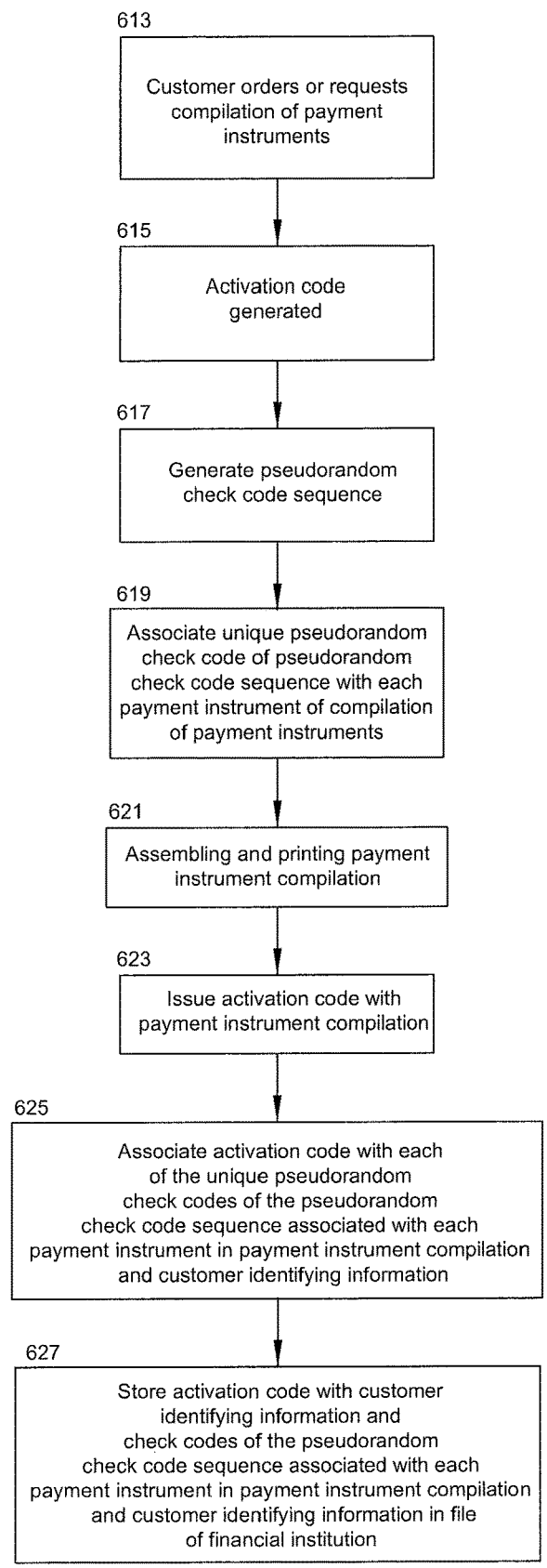
FIG. 6 is a flow chart illustrating a method for securing payment instruments according to an embodiment of the present invention.

With reference to FIG. 6, the customer may order or request a checkbook at block 213. Upon receipt of the request or order from the customer, at block 215, an activation code may be generated by the financial institution using any appropriate method known or used in the art. As discussed above, in an alternate embodiment, the activation code, or an identical activation code, may be generated by a third party check provider or check printing service provider. In the present embodiment, at block 617, and upon receipt of the request or order from the customer at block 215, a pseudorandom check code sequence is generated by the financial institution. Each check code in the pseudorandom check code sequence includes at least one or more of a number, letter or symbol, or combination thereof, that is unique to each check of the plurality of checks in the checkbook ordered by the customer at block 213. The pseudorandom check code sequence may be generated by any appropriate method known in the art. For example, a pseudorandom check code of the pseudorandom check code sequence for a requested checkbook may be generated as "34", "3216", "183", "9", "6543", "74a5", or "37ps2". In a preferred embodiment, the pseudorandom check code sequence is generated by a pseudorandom number generator (PRNG) and includes a sequence of pseudorandom codes of variable length numeric values. In an embodiment, at least a portion of a pseudorandom check code of the generated pseudorandom check code sequence may include the activation code. In another embodiment, computer processing unit 152 may also be programmed to execute a pseudorandom check code sequence generating algorithm that returns a sequence of pseudorandom line check codes each time the program is called. In a preferred embodiment, the computer processing unit 152 may also be programmed to execute a pseudorandom check code sequence generating algorithm that returns a sequence of pseudorandom check codes each time the program is called. In an alternate embodiment, the pseudorandom check code sequence may be generated by a third party check provider or check printing service provider.

In embodiments implemented using software, the software may be stored in a computer program product and loaded into computer processing unit 152 using removable storage drive 312, hard drive 310, or communications interface 320. The software, when executed by a processor 302, causes the processor 302 to perform the functions of the pseudorandom check code sequence algorithm. In another embodiment, the pseudorandom check code sequence algorithm may be implemented primarily in hardware using, for example, hardware components such as a digital signal processor comprising application specific integrated circuits (ASICs). In yet another embodiment, the pseudorandom check code sequence algorithm is implemented using a combination of both hardware and software.

At block 617, the financial institution may generate a pseudorandom check code sequence by any appropriate method known or used in the art. It is understood that a pseudorandom check code sequence algorithm should produce a pseudorandom check code sequence with a period that is long enough so that a finite sequence of reasonable length is not periodic, and where each unique pseudorandom check code is not repeated within the same checkbook so that customers can easily reconcile their checks with the financial institution. In a preferred embodiment, the generated pseudorandom check code sequence is cryptographically secure. In an embodiment, at block 617, a third party check provider or check printing service provider may generate an identical pseudorandom check code sequence for the customer requested checkbook at block 213. It is understood that the financial institution and third party check provider or check printing service provider should use identical pseudorandom check code sequence generating algorithms, identical pseudorandom sequence generators in synchronism and an identical seed previously supplied in advance of the pseudorandom check code sequence generation. In an embodiment, the pseudorandom check code sequences generated by the financial institution and third party check provider or check printing service provider may be verified by any secure communication method known in the art including secure communication methods employing asymmetric or symmetric encryption techniques, message authentication codes, secure hashing algorithms, and/or, as discussed above, a combination thereof using, for example, a network security protocol known in the art such as SSL or TLS where the information sent between the financial institution and third party check provider or check printing service provider is encrypted.

At block 619, a unique pseudorandom check code of the generated pseudorandom check code sequence is associated with each of the checks of the plurality of checks in the checkbook by the financial institution, third party check provider or third party check printing service provider. At block 621, in embodiments including a compilation of paper financial instruments, such as a paper checkbook, each of the plurality of paper checks, including the associated unique pseudorandom check code of the generated pseudorandom check code sequence, in the checkbook is printed, assembled and united into a booklet form by the financial institution, third party check provider or third party check printing service provider as requested by the customer at block 213. In embodiments including a compilation of electronic financial instruments, such as an electronic checkbook, each of the plurality of electronic checks, including the associated unique pseudorandom check code of the generated pseudorandom check code sequence, in the checkbook, is created, electronically assembled and electronically united into an electronic checkbook file by the financial institution, third party check provider or third party check printing service provider at block 621, as requested by the customer at block 213.

Figure 7:
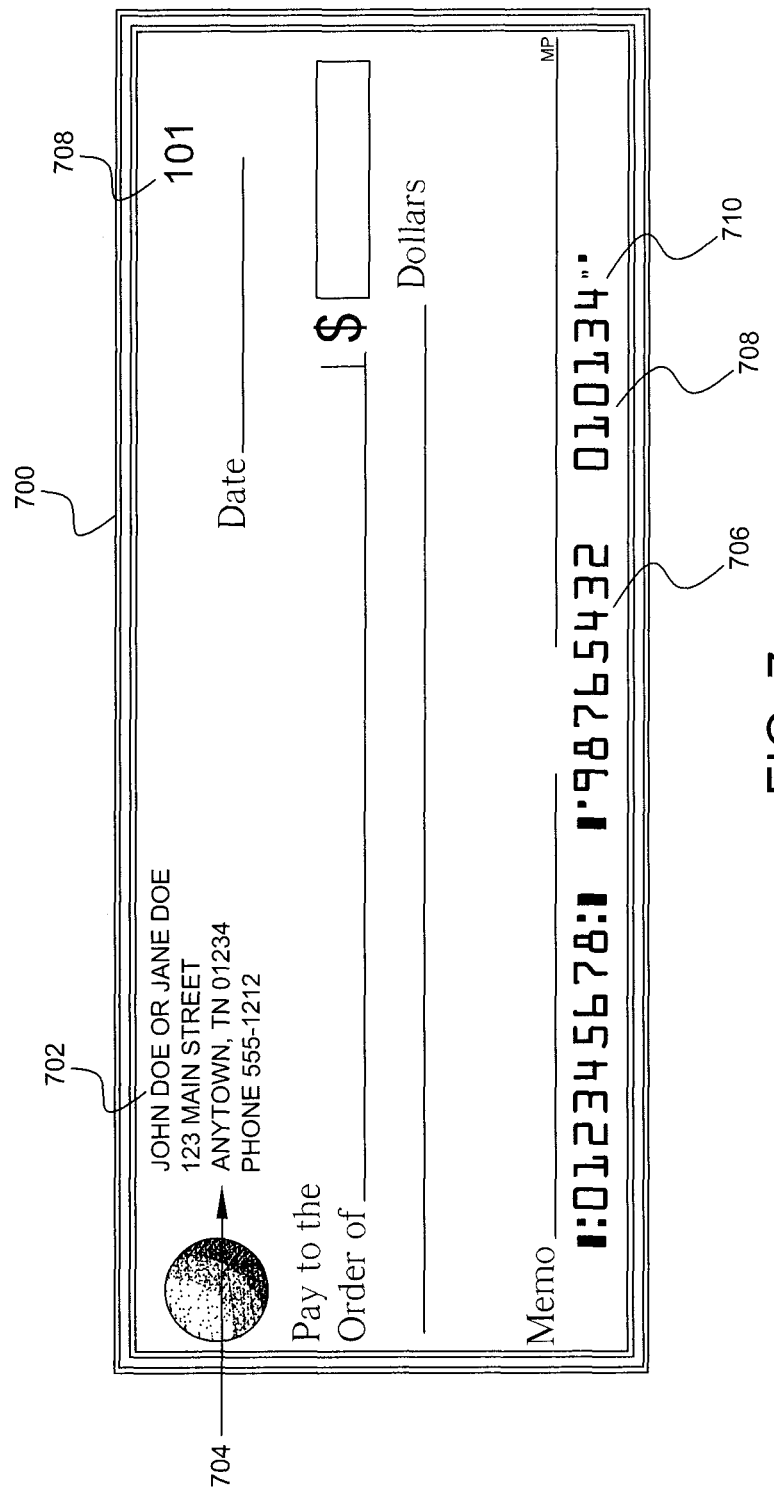
FIG. 7 is an illustrative example of a paper check according to an embodiment of the present disclosure.

With reference to FIG. 7, a check including a unique pseudorandom check code 708 also includes a customer name 702, a customer address 704, a customer account number 706 printed on the check in traditional Magnetic Ink Character Recognition (MICR) format, and a check sequence number 708. The check sequence number 708 may be included on the check for the convenience of the customer such as for use in balancing the customer's checkbook. Unique pseudorandom check code 710 is illustrated as a MICR line check number printed adjacent to customer account number 706. However, one skilled in the art would understand that unique pseudorandom check code 710, as illustrated, represents only an exemplary form of a unique pseudorandom check code that is contemplated by the present disclosure.

Returning to FIG. 6, at block 623, the activation code generated at block 215 is issued to an address of the customer stored or possessed by the financial institution at, for example, records or files at data storage units 154, 156. The address of the customer may include, but is not limited to, a physical mailing address or electronic mailing address. In an embodiment, the customer may be requested to verify the physical mailing address or electronic mailing address that is stored or possessed by the financial institution prior to requesting or ordering a checkbook at block 213. In an exemplary embodiment using a paper checkbook, the activation code may be mailed to an address of the customer stored by the financial institution, third party check provider or third party check printing service provider with the printed checkbook that was ordered by the customer at block 213 and assembled by the financial institution, third party check provider or third party check printing service provider at block 621. The activation code may be printed on a card or a sticker with instructions to the customer such as, for example, "Use the below code to activate your checkbook". The card or sticker may also include instructions for contacting the financial institution to activate the checkbook including, but not limited to, a website address, secure electronic mailing address, or telephone number, and instructions for activating the checkbook once contact has been established with the financial institution.

At block 625, the activation code generated for the customer's checkbook at block 215 is associated with each of the unique pseudorandom check codes of the generated pseudorandom sequence associated with each of the plurality of checks in the checkbook at block 619. The generated activation code is unique to the plurality of checks in the checkbook ordered by the customer at block 213. At block 625, the activation code generated for the customer's checkbook at block 215 may be associated with identifying information for the customer. The identifying information for the customer may be stored in records or files possessed by, or stored at, the financial institution, including, but not limited to, at data storage units 154, 156. In another embodiment, the customer's identifying information may be stored in records or files possessed by, or stored at, a third party check provider or third party check printing service provider. At block 627, the generated activation code may be stored in the appropriate customer's records or files possessed by, or stored at, the financial institution. with at least a portion of the customer identifying information and each of the unique pseudorandom check codes of the generated pseudorandom sequence associated with each of the plurality of checks in the checkbook at block 619. In another embodiment, at block 423, the activation code, customer identifying information, and each of the unique pseudorandom check codes of the generated pseudorandom sequence associated with each of the plurality of checks in the checkbook at block 619 may be stored in the appropriate customer's records or files possessed by, or stored at, a third party check provider.

Figure 8:
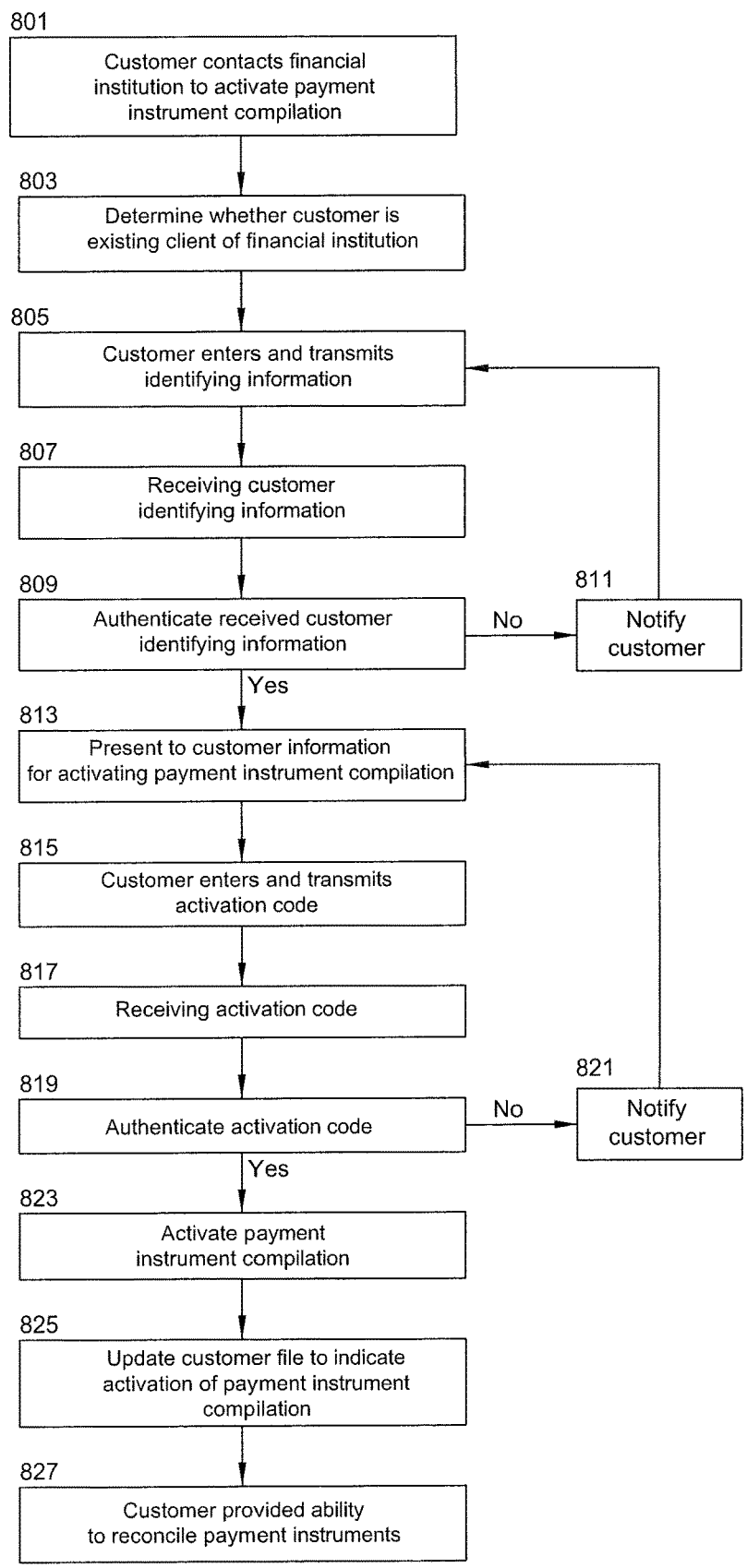
FIG. 8 is a flow chart showing a method for activating a compilation of payment instruments according to an embodiment of the present disclosure.

Referring to FIG. 8, in order to activate a compilation of payment instruments according to an embodiment of the present invention, at block 801 a customer may contact a financial institution to activate a compilation of payment instruments, such as a checkbook, that may have been issued to the customer by the financial institution, third party check provider or third party check printing service provider. In an embodiment, an activation code unique to a checkbook is issued by a financial institution, third party check provider or third party check printing service provider and received by the customer with the corresponding checkbook. In an alternate embodiment, a customer may contact a financial institution to activate a checkbook after receiving an activation code unique to an electronic checkbook. One skilled in the art will recognize that the customer may activate a checkbook by contacting the financial institution through a wide variety of methods including, but not limited to, telephone, electronic mail, mobile telephone, SMS, physical mail or by entering the financial institution's electronic system for online checkbook activation. The financial institution's electronic system for online checkbook activation may be a website provided by the financial institution's online banking access system 150 that the customer may access via a public or private network. The customer may enter the website a number of ways (i.e., the customer's entrance into the financial institution's website may be "path sensitive," which may have implications) such as via a public network, via a link from another account the customer may have with the financial institution, via a notice or alert sent to the customer by the financial institution, via an e-mail advertisement sent to the customer by the financial institution, in response to a receipt of a promotional advertisement, etc.

At block 803, a determination may be made as to whether the customer is an existing client of the financial institution. In an embodiment, a determination may be made as to whether the customer is an existing online client of the financial institution. This determination may be based on information from block 801 or other information provided by the customer or from another source, including records or files possessed by, or stored at, the financial institution, including, but not limited to, at data storage units 154, 156. In an embodiment, the determination at block 803 may be made as to whether the customer is an existing offline client of the financial institution or both an online and offline client of the financial institution. If the customer is an existing online client of the financial institution, then at block 805, the customer enters and transmits information for identifying the customer, such as, for example, a username and password. This information may typically be entered and transmitted to the financial institution using a computer such as, for example, through customer's terminal 108, 110 or local computer 164. Alternatively, other information for identifying the customer may be entered or used in place of a username and password. In one embodiment, since the customer is an existing online client of the financial institution, only a limited amount or portion of information need be entered by the customer. In an exemplary embodiment, the information sent between the customer and the financial institution is encrypted using a network security protocol known in the art such as, for example, Secure Socket Layer (SSL) or Transport Layer Security (TLS). If the customer is an existing offline client of the institution, the customer provides or transmits information for identifying the customer, at block 805, such as, for example, the customer's name, customer's mailing address, the customer's electronic mailing address, the customer's account number, the customer's social security number, the customer's bank's name, the customer's bank identification number, the customer's bank's routing transit number, telephone call-in information assigned to the customer by the financial institution or selected by the customer during account set-up, a call-in password, a call-in PIN, or any combination thereof. In an embodiment, since the customer is an existing offline client of the financial institution, only a limited amount or portion of information need be transmitted by the customer to the financial institution.

At block 807, the information provided by the customer at block 805 may be received by the financial institution based on the method for transmission employed by the customer at block 805. At block 809, the customer identifying information received by the financial institution at block 807 may be authenticated. For example, the customer identifying information may be compared to identifying information stored for the customer in records or files possessed by, or stored at, the financial institution, including, but not limited to, at data storage units 154, 156. If the received customer identifying information is not authenticated, the financial institution may inform the customer that the information provided at block 805 is incorrect by any appropriate method known in the art including, for example, by displaying an error message on the customer's computer screen at block 811 and looping the process back to block 805. If the customer identifying information received by the financial institution at block 807 is authenticated, then the financial institution may, at block 813, present to the customer (e.g. by displaying information on a webpage presented to the customer) at, for example, the customer's terminal 108, 110 or local computer 164, information for activating a compilation of payment instruments. In an embodiment, the financial institution may provide to the customer, at block 813, information for activating a checkbook by telephone, mobile telephone, SMS, electronic mail, physical mail, or any other correspondence mechanism.

The information for activating a checkbook presented to the customer at block 813 may be dynamically presented based at least partially on the information provided by the customer at block 801 or 805 or from another source, including records or files possessed by, or stored at, the financial institution, including, but not limited to, at data storage units 154, 156. For example, the information for activating the checkbook may include a checkbook issued for one or more types of accounts held by the customer at the financial institution including, but not limited to, a savings account, checking account, money market account, etc. In an embodiment, the information for activating the checkbook may include information such as the name of the primary account holder, the name of a joint account holder, an account number of a checking, savings, money market or other account, a physical or electronic mailing address of the customer, terms and conditions for activating the checkbook, etc. The terms and conditions, as is known in the art, typically includes information appropriate for a product to be activated by a customer, in this case at block 813, and may include information, such as, but not limited to, minimum balance requirements, payment rules, interest rates charged, overdraft charges, late fee applicability, etc.

Figure 9:
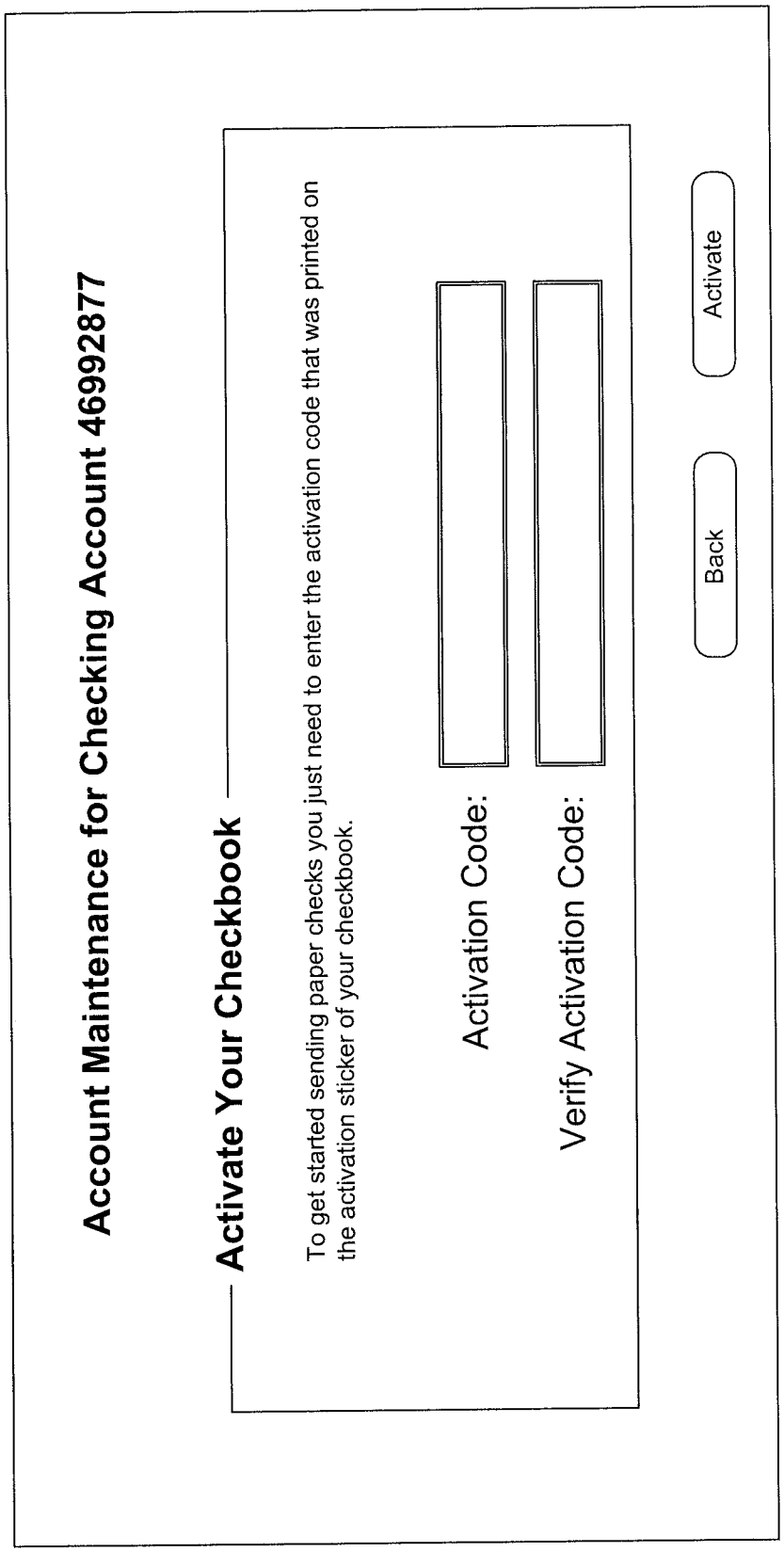
FIG. 9 is an illustrative website screenshot according to an embodiment of the present invention.

Referring to FIG. 9, the customer may be asked to enter and verify the accuracy of the activation code that was issued to the customer with the checkbook at blocks 419 or 623. In one embodiment, the customer may be requested to verify the accuracy of other information presented at block 813 and/or accept terms and conditions presented at block 813 prior to activating the checkbook. In a further embodiment, the customer may perform edits to the information presented at block 813 to ensure accuracy. In another embodiment, the information for activating the checkbook may include a link to a third party provider site, including but not limited to, a check provider. At block 815, the customer transmits to the financial institution, or check provider, the activation code issued to the customer. If the customer is an existing online client of the financial institution, then at block 815, the customer may enter and transmit the activation code using a computer such as, for example, through customer's terminal 108, 110 or local computer 164. If the customer is an existing offline client of the financial institution, then at block 815, the customer may transmit the activation code using a wide variety of methods including, but not limited to, telephone, electronic mail, mobile telephone, SMS or physical mail.

At block 817, the activation code provided by the customer at block 815 may be received by the financial institution based on the method for transmission employed by the customer at block 815. At block 819, the activation code received by the financial institution at block 817 may be authenticated. For example, the activation code may be compared to an activation code stored for the customer in records or files possessed by, or stored at, the financial institution, including, but not limited to, at data storage units 154, 156. If the received activation code is not authenticated, the financial institution may inform the customer that the activation code provided at block 815 is incorrect by any appropriate method known in the art including, for example, by displaying an error message on the customer's computer screen at block 821 and looping the process back to block 815. If the activation code received by the financial institution at block 817 is authenticated, then the financial institution may, at block 823, activate the checkbook associated with the stored activation code, for example, at blocks 421 and 625. In an embodiment, the financial institution may present to the customer (e.g., by displaying information on a webpage presented to the customer) at, for example, the customer's terminal 108, 110 or local computer 164, information indicating that the checkbook associated with the stored activation code has been activated. At block 825, the financial institution may update the authenticated customer's records or files possessed by, or stored at, the financial institution, including, but not limited to, at data storage units 154, 156, to indicate that the checkbook associated with the stored activation code has been activated. At block 827, the customer may be able to obtain information and details of each check of the plurality of checks in the activated checkbook by contacting the financial institution through a wide variety of methods including, but not limited to, telephone, mobile telephone, SMS, electronic mail, physical mail or by entering and accessing the financial institution's electronic system for online banking. Thus, for example, a customer may be able to reconcile each of the plurality of checks in the activated checkbook online on the financial institution's website. In an embodiment, a customer may be able to contact the financial institution to obtain, retrieve and/or view information or details on each of the plurality of checks in the activated checkbook at a variety of stages during the life of a check, for example, cashed checks, outstanding checks or voided checks, online on the financial institution's website. A customer may also be provided with the capability to actively reconcile each of the plurality of checks in the activated checkbook through a financial institution or check service provider. For example, a customer may be provided with the capability to stop payment of a check, void a check, cancel one or more of the plurality of outstanding checks in the activated checkbook online using, for example, the financial institution's website. In an embodiment, a customer may be provided with the capability to register information and/or details on a check of the plurality of checks, online on the financial institution or check service provider's website or at a separate portal maintained by the financial institution or check service provider.

Figure 13:
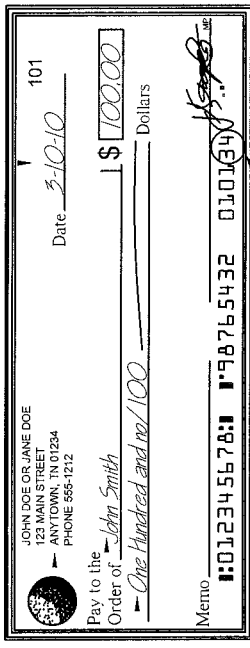
FIG. 13 is an illustrative website screenshot according to an embodiment of the present disclosure.

For example, and with reference to FIG. 12, the financial institution or check service provider may establish and dynamically present an online check register, such as an online check and/or transaction register, where a customer may register and/or record information and/or details on a check or financial transaction. For example, a customer may be dynamically presented with an online check register including check information including, but not limited to, a check number, unique pseudorandom check code, activation status, date and/or time of activation, MICR data of a check, account number of the customer, customer name, joint account holder name, and/or account balance, of a plurality of checks, such as in a checkbook, of the customer. Referring to FIG. 13, a customer may dynamically enter or update information from the check and/or a financial transaction associated with the check including, but not limited to, a check or transaction amount, a payee name, a payee address, a transaction date, a transaction time, and/or a transaction description into an online check register. The online check register may be an intelligent check register. An intelligent check register may provide for automatic reconcilement of a check and/or transaction, such as at a time when a check is presented for deposit or a transaction authorization request is received. An online check register may be maintained in records or files possessed by, or stored at, the financial institution, including, but not limited to, at data storage units 154, 156.

Figure 10:
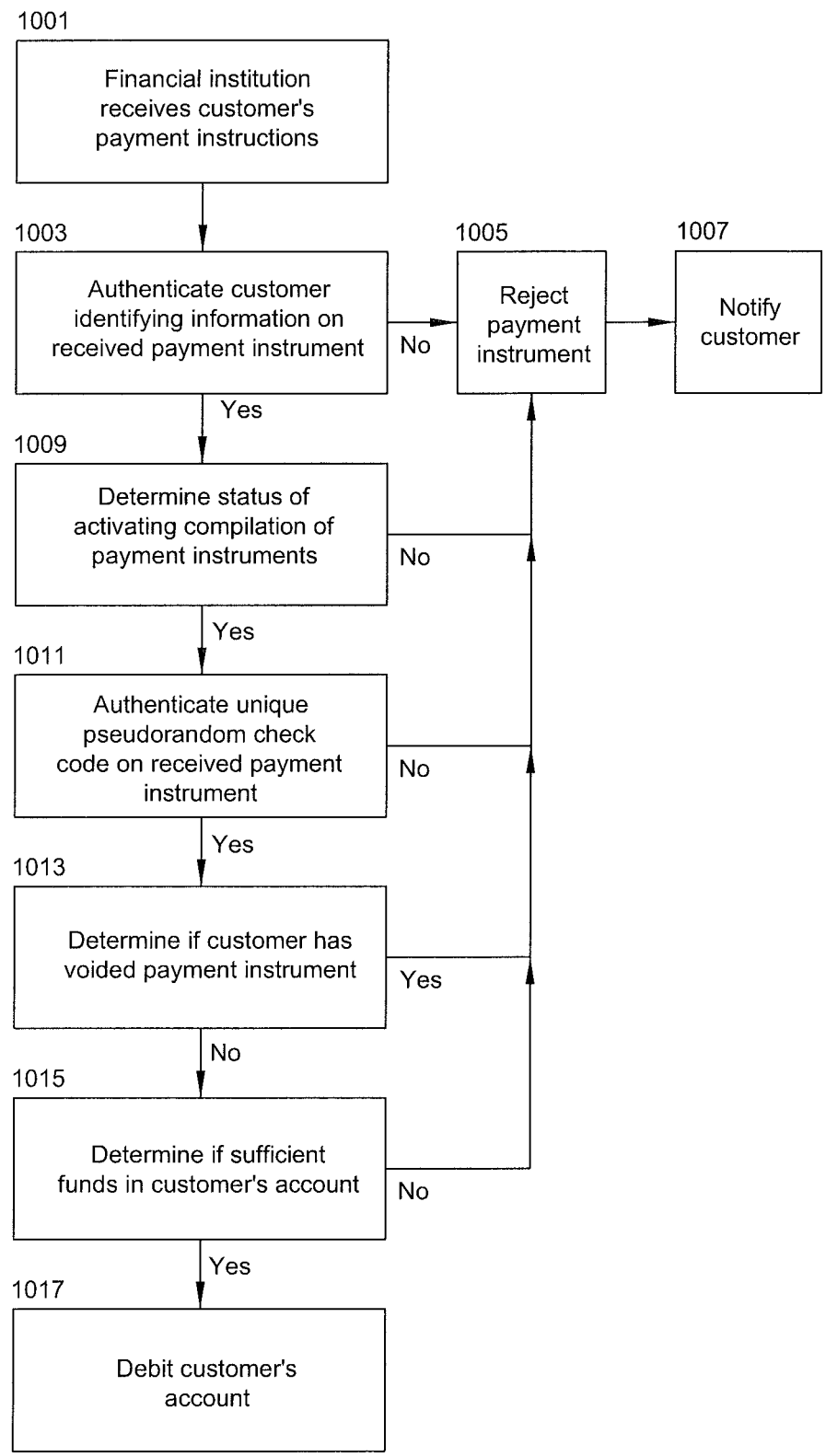
FIG. 10 is a flow chart for authenticating a received payment instrument according to an embodiment of the present disclosure.
Figure 11:
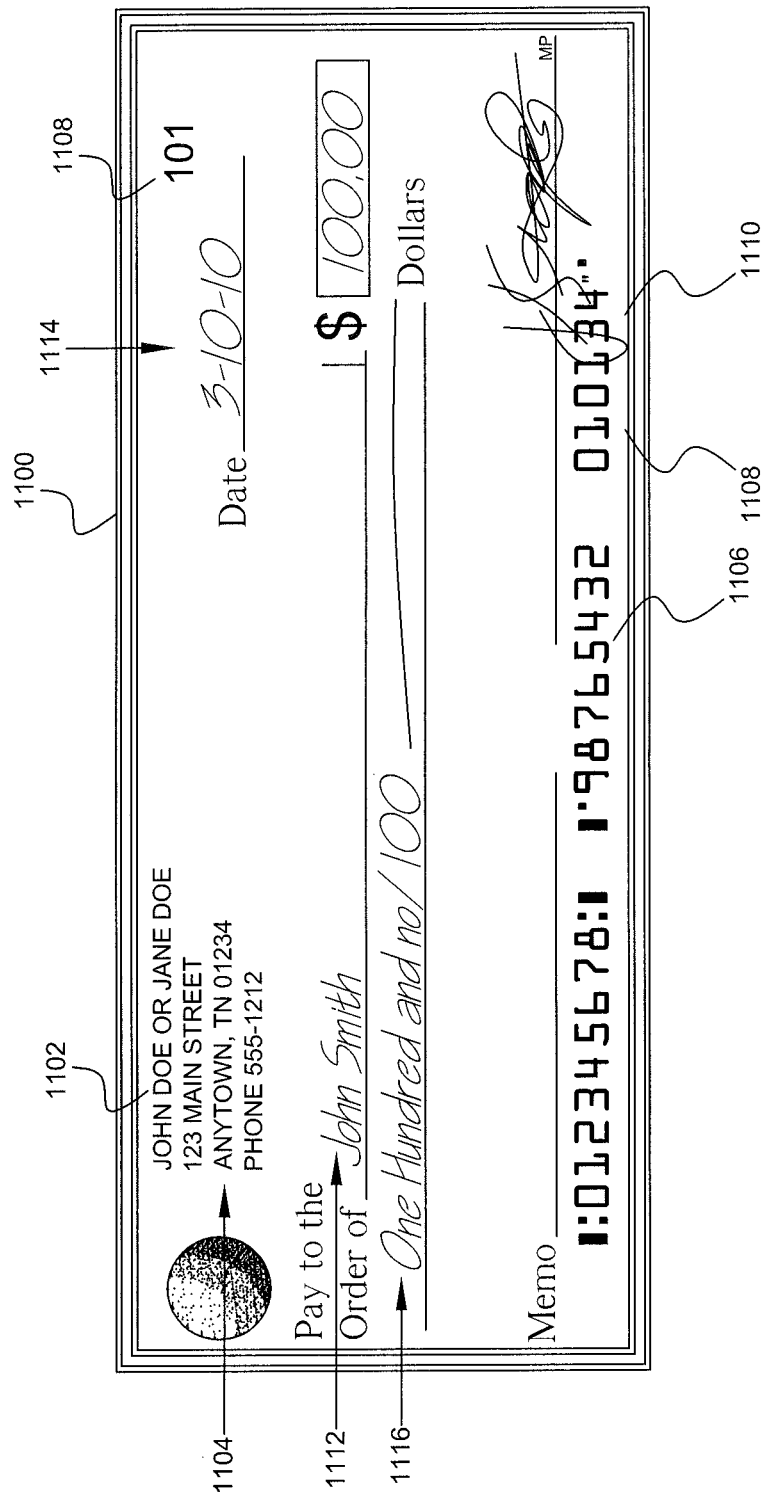
FIG. 11 is an illustrative example of a paper check according to an embodiment of the present disclosure.

With reference now to FIGS. 10 and 11, at block 1001, a financial institution may automatically authenticate a request for financial transaction when, for example, it receives a customer's check which may include a customer name 1102, a customer address 1104, a customer account number 1106, a check sequence number 1108, a unique pseudorandom check code 1110, and transaction-related information such as a payee name 1112, a date 1114, and an amount 1116. The check may be a paper check or an electronic check. In an embodiment, a customer may have previously provided the check to a third party. The third party may be a company or person to whom the customer owes a debt or desires to make a payment. For example, the customer may provide a paper check to a utility company to cover a monthly bill or to a friend or relative as a gift. In an embodiment, the customer may provide an electronic check to one or more payees to satisfy a debt or make a payment. One skilled in the art will recognize that the customer may provide a check through a wide variety of methods including, but not limited to, telephone, mobile telephone, electronic mail, physical mail, by submitting a bill payment request through a financial institution's electronic system for online bill payment, or by providing a check directly to a third party. In an embodiment using electronic systems for online bill payment, a financial institution or check service provider may provide a paper check or electronic check based on the customer's online bill payment request to a third party on behalf of the customer. In another embodiment, the customer may submit a request to create a paper check from an electronic check through a financial institution's website displayed on, for example, a customer's terminal 108, 110 or to local computer 164 at the customer's home, office or other location. In one embodiment, the third party may deposit the check in a financial institution of the third party, such as for example, a bank of first deposit. One skilled in the art would understand that a bank of first deposit may include any financial institution where a customer's check is initially deposited to an account. For example, if the check is drawn on another financial institution or bank, the collecting bank may present the check directly to a paying financial institution or the collecting bank may present the check to a correspondent bank or clearinghouse corporation, or to the Federal Reserve Bank for settlement against a paying financial institution's reserve account. One skilled in the art would also understand that a Federal Reserve Bank may be any of the regional banks in the Federal Reserve System. In an embodiment, the bank of first deposit may scan the deposited check and send an electronic image of the deposited check, or a substitute check, to a paying financial institution or Federal Reserve Bank as appropriate. In an embodiment including a Federal Reserve Bank, the Federal Reserve Bank may process the check and send an electronic image, or substitute check, to the paying bank through, for example, the Federal Reserve's check clearing system. In an embodiment, a correspondent bank or clearinghouse corporation may process the check through an electronic check processing system such as, for example, FedWire or Clearing House Interbank Payment System (CHIPS).

Figure 14:
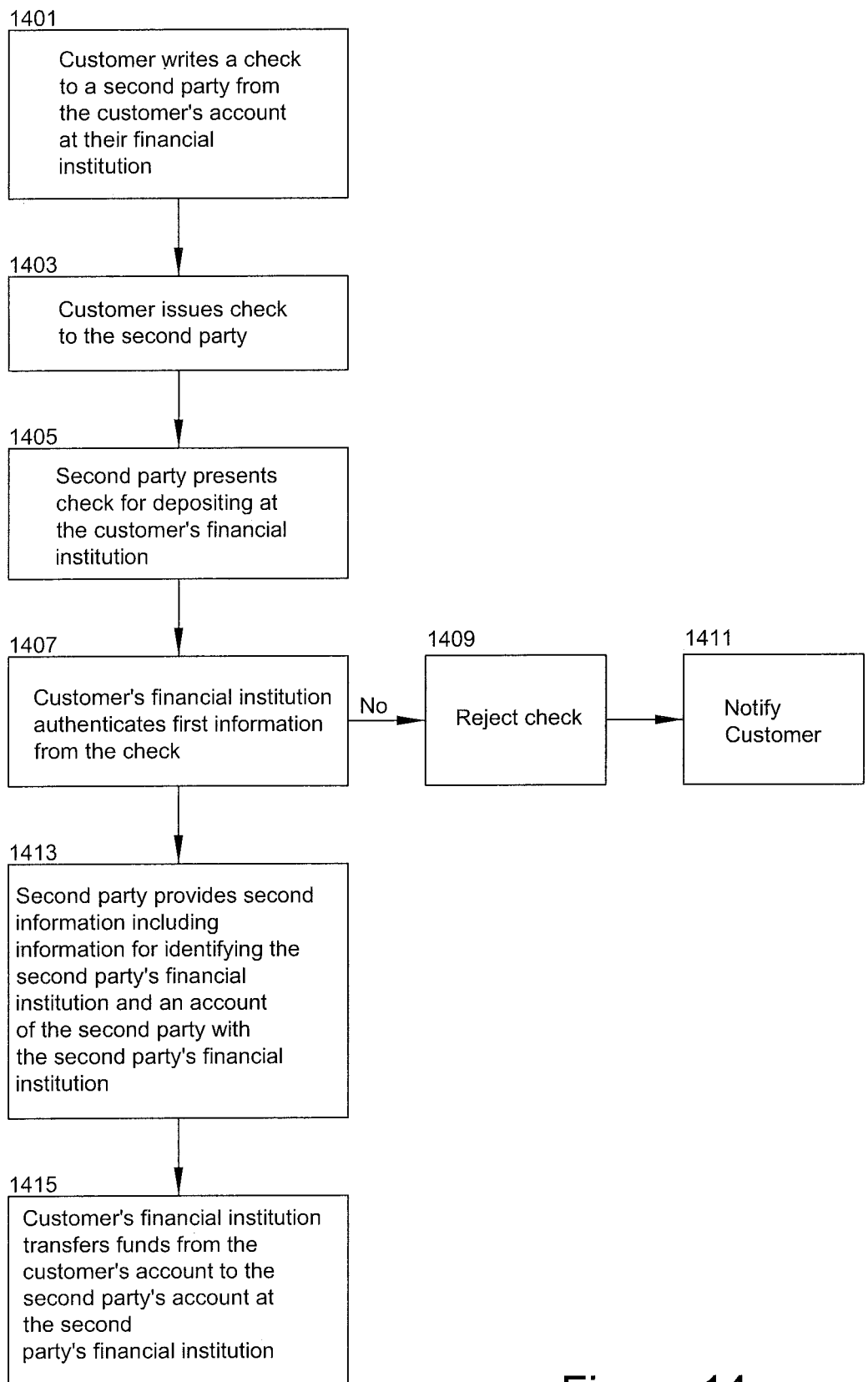
FIG. 14 is a flow chart for clearing a payment instrument according to an embodiment of the present disclosure.

Referring to FIG. 14, at block 1401, in an embodiment, a customer may write a check to a second party from the customer's account. The second party may be, for example, a company or person to whom the customer owes a debt or desires to make a payment. The check may be a paper check or an electronic check. The check may be from the customer's checking account. At block 1403, the customer provides or issues the check to the second party. The customer may provide the check to the second party using a wide variety of methods. In the illustrated embodiment, at block 1405, the second party may present the check for depositing to the customer's financial institution. At block 1407, the customer's financial institution will authenticate information on the presented check. For example, the customer's financial institution may identify its customer's identifying information on the check and may compare the customer identifying information to identifying information for the customer in records or files possessed by, or stored at, the financial institution, including, but not limited to, at data storage units 154, 156. If the customer identifying information on the presented check is authenticated, the financial institution may further authenticate the presented check by determining the status of activating a checkbook, i.e., a plurality of checks, for the authenticated customer. For example, the financial institution may determine the status of activating a checkbook for the authenticated customer by determining if the activation code stored in records or files possessed by the financial institution has been updated to indicate that it was activated by the authenticated customer. If the authenticated customer is determined to have an activated checkbook, the financial institution may authenticate the unique pseudorandom check code on the presented check by, for example, comparing it with the stored unique pseudorandom check codes of the pseudorandom sequence associated with the authenticated customer to determine if the presented check pseudorandom check code matches one of the stored unique pseudorandom check codes for the activated checkbook. In another embodiment, the financial institution may actively reconcile other check information with information stored in an online check register. For example, a financial institution may compare an amount identified on the presented check against an amount registered by the customer in an online check register. If the customer identifying information, or the unique pseudorandom check code, on the presented check is not authenticated, or if the checkbook of the presented check has not been activated, or if the information on the presented check does not match the information stored in the online check register, the financial institution may reject the check at block 1409 by any appropriate method. If the financial institution rejects the check, it may notify the customer of the rejected check at block 1411.

If the presented check has been authenticated, the second party, may at block 1413, provide the customer's financial institution with information to transfer the funds from the customer's account to an account of the second party. In an embodiment, the second party may provide the customer's financial institution with information for identifying an account of the second party with the second party's financial institution and also information for identifying the second party's financial institution. For example, the second party may provide the customer's financial institution with his checking account number at his financial institution and the routing transit number (RTN) of his financial institution. In another embodiment, the second party may provide the customer's financial institution with the name or bank identification number of his financial institution. At block 1415, the customer's financial institution will transfer the appropriate funds associated with the check amount of the presented check from the customer's account to the second party's account at the second party's financial institution. For example, the customer's financial institution may send the funds as an automated clearing house (ACH) transaction to the second party's financial institution. The second party's financial institution may receive the funds and post the amount to the second party's account specified in the ACH transfer.

Figure 15:
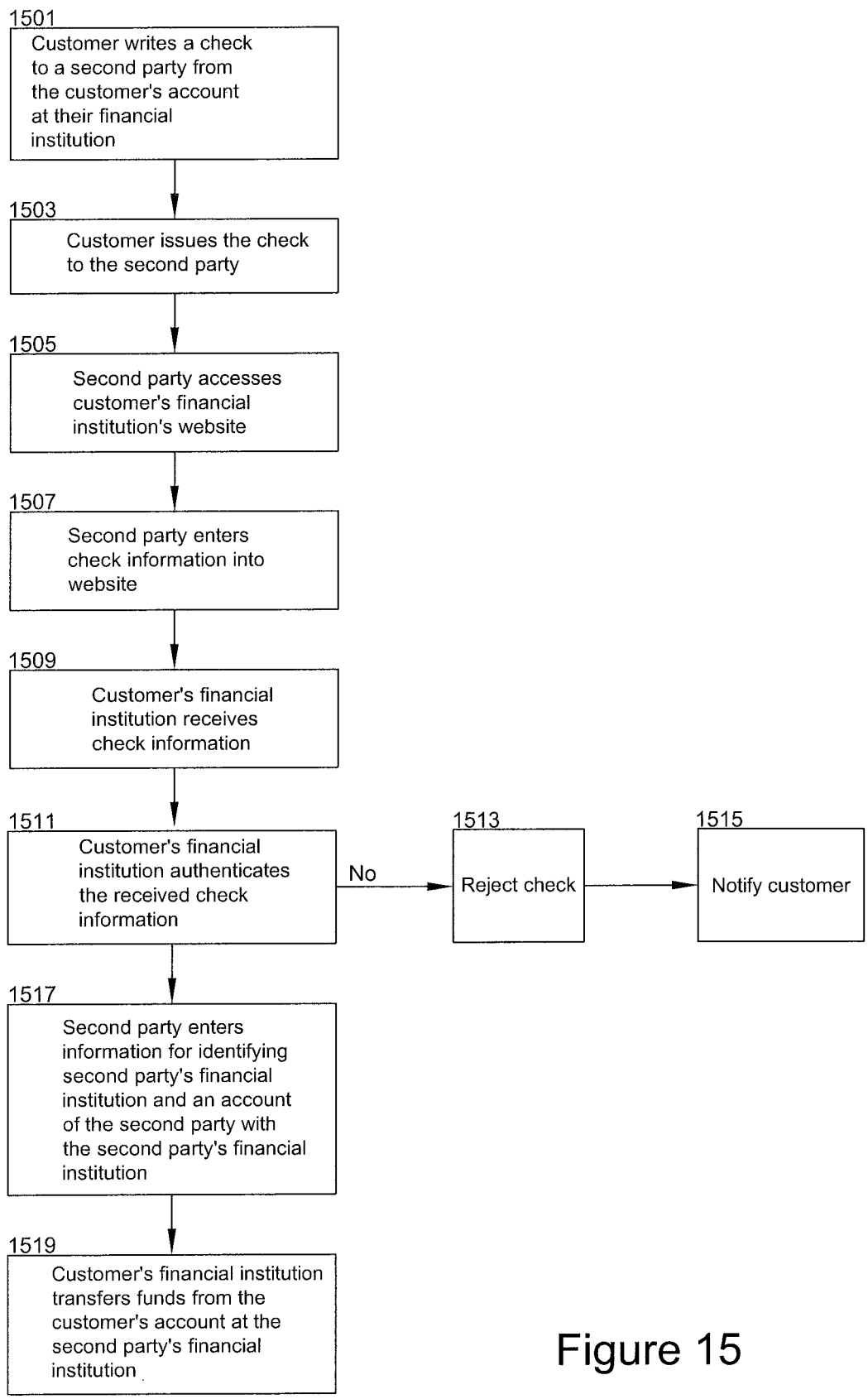
FIG. 15 is a flow chart for clearing a payment instrument according to another embodiment of the present disclosure.
Figure 16:
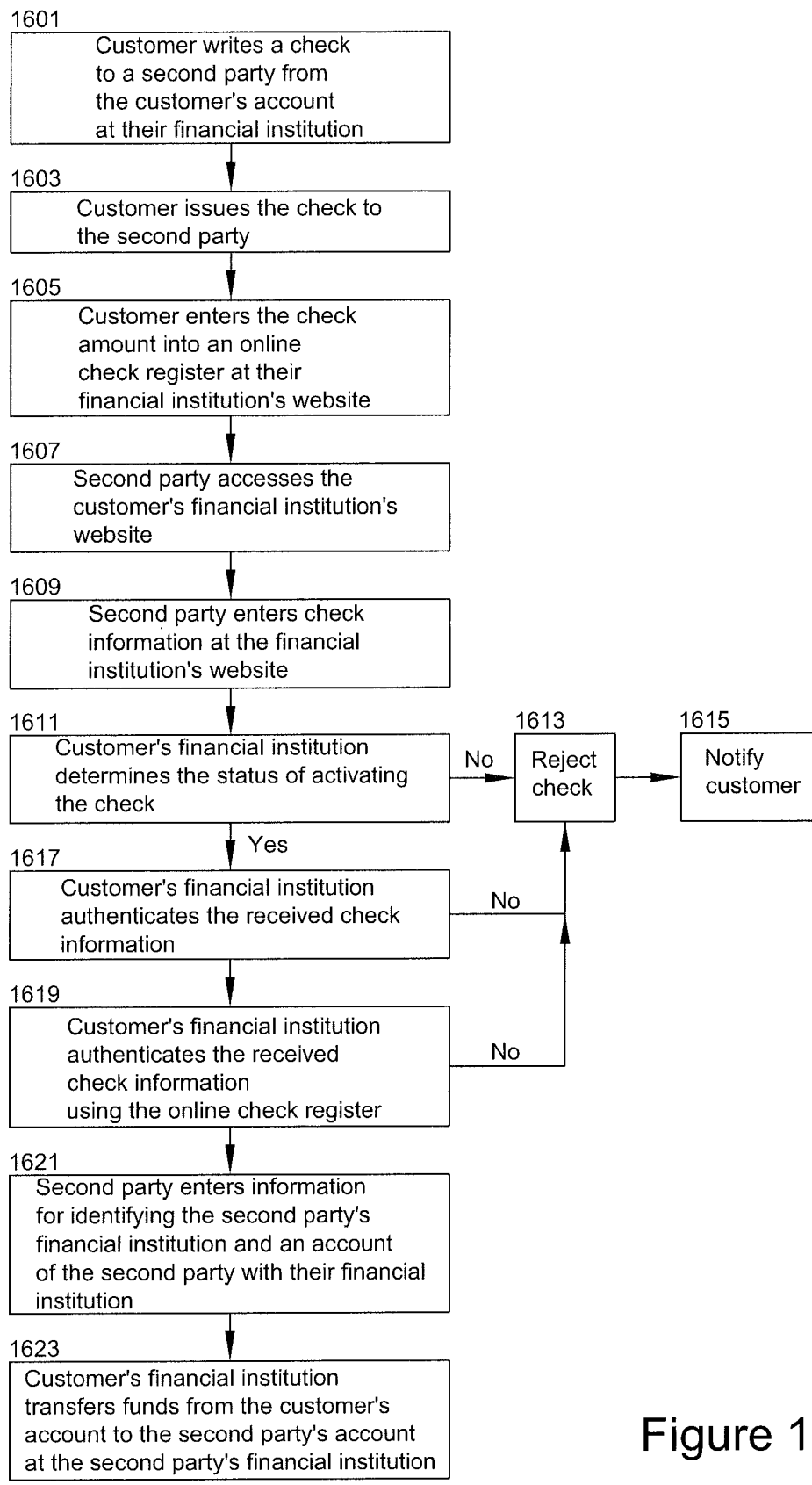
FIG. 16 is a flow chart for clearing a payment instrument according to an embodiment of the present disclosure.

With reference to FIGS. 15 and 16, at blocks 1501 and 1601 respectively, a customer may write a paper check to a second party from the customer's account at his financial institution. At block 1503 (1603), the customer provides or issues the check to the second party. In an embodiment, at block 1605, the customer may access, for example, his financial institution's website to update information from the check issued to the second party in an online check register. For example, a customer may dynamically enter or update the check amount from the check issued to the second party. At block 1505 (1607), the second party electronically presents paper check information to the customer's financial institution. For example, the second party may access a customer's financial institution's website or a portal maintained by the customer's financial institution for check clearing. At block 1507 (1609), the second party may enter information from the customer's check for authentication. For example, the second party may enter check information via the third party's terminal 108, 110 and by accessing the customer's financial institution's website or a portal. In an embodiment, the second party may enter information for identifying the customer from the paper check, including, but not limited to the customer's name, the customer's address or the customer's account number, MICR data from the check, the pseudorandom check code on the paper check, the check amount, the check sequence number, the check date, and/or the check description via the customer's financial institution's website. In an embodiment, the check information sent between the second party and the customer's financial institution is encrypted using a network security protocol such as, for example, Secure Socket Layer (SSL) or Transport Layer Security (TLS). At block 1509 (1611), the customer's financial information may receive the check information entered by the second party for authentication. At block 1511 (1619), the customer's financial institution authenticates the check information received from the second party from the paper check issued by the customer. In an embodiment, the customer's financial institution may compare the customer identifying information from the check entered by the second party to identifying information for the customer in records or files possessed by, or stored at, the financial institution, including, but not limited to, at data storage units 154, 156. If the customer identifying information entered by the second party is authenticated, at block 1617, the financial institution may further authenticate the received check information by determining the status of activating a checkbook for the authenticated customer. If the authenticated customer is determined to have an activated checkbook, at block 1511 (1619), the customer's financial institution may authenticate the unique pseudorandom check code entered by the second party by, for example, comparing it with the stored unique pseudorandom check codes of the pseudorandom sequence associated with the authenticated customer to determine if the received pseudorandom check code matches one of the stored unique pseudorandom check codes for the activated checkbook. In an embodiment, at block 1619, The financial institution may actively reconcile other received check information with information stored in an online check register. For example, a financial institution may compare a check amount entered by the second party for the customer's check against an amount registered by the customer in an online check register. If the received customer identifying information, or the received unique pseudorandom check code, is not authenticated, or if the checkbook of the customer's check has not been activated, or if the received check information does not match the information stored in the online check register, the financial institution may reject the check at block 1513 (1613) by any appropriate method. If the financial institution rejects the check, it may notify the customer of the rejected check at block 1515 (1615).

If the received check information has been authenticated, the customer's financial institution may notify the second party by any appropriate method. For example, the customer's financial institution may notify the second party via their website or web portal and may request that the second party provide additional information for clearing the customer's check. At block 1517 (1621), the second party may enter at, for example, the customer's financial institution's website, information to transfer the funds from the customer's account to an account of the second party. In an embodiment, the second party may electronically enter information for identifying an account of the second party with the second party's financial institution and also information for identifying the second party's financial institution. For example, the second party may electronically enter his checking account number at his financial institution and the routing transit number (RTN) of his financial institution. In another embodiment, the second party may electronically enter the name or bank identification number of his financial institution. At block 1519 (1623), the customer's financial institution will transfer the appropriate funds associated with the check amount of the received check information from the customer's account to the second party's account at the second party's financial institution. In an embodiment, the customer's financial institution may send the funds as an automated clearing house (ACH) transaction to the second party's financial institution. The second party's financial institution may receive the funds and post the amount to the second party's account specified in the ACH transfer.

In another embodiment, and with reference to FIGS. 17 and 18, a third party, for example a check recipient, may electronically enter deposit information for a customer's check 1100 in an electronic check depositing request. For example, a third party may access a customer's online banking service provider's website or a portal maintained by the online banking service provider for electronic check depositing. A third party may enter check deposit information via the third party's terminal 108, 110 and by accessing the customer's online banking service provider's website or a portal. The deposit information may include, but is not limited to, information for identifying the customer, MICR data from the check including, for example, a unique pseudorandom check code, an account number of the customer, and/or a routing number for the customer's online banking service provider, a check amount, an account number of the third party, and/or a routing number of a financial institution of the third party. In an embodiment, the deposit information sent between the third party and the customer's online banking service provider is encrypted using a network security protocol known in the art such as, for example, Secure Socket Layer (SSL) or Transport Layer Security (TLS). To facilitate an electronic check depositing transaction, a check may include instructions for contacting the customer's online banking service provider to electronically deposit the check including, but not limited to, a website address, portal information, a secure electronic mailing address, a telephone number, and/or instructions for electronically depositing the check once contact has been established with the financial institution. The customer's online banking service provider may process the electronic check depositing request through a wide variety of methods. In an embodiment, the customer's online banking service provider may process the electronic check depositing request as an ACH transfer using the received deposit information.

Referring to FIG. 10, at block 1003, the financial institution may authenticate the customer identifying information on the received check 1100. For example, the customer identifying information on the received check 1100 may be compared to identifying information for the customer in records or files possessed by, or stored at, the financial institution, including, but not limited to, at data storage units 154, 156. In an embodiment, the financial institution may authenticate customer identifying information from a check 1100 entered by a third party at, for example, a website or portal maintained by the online banking service provider. If the customer identifying information on the received check 1100 is not authenticated, the financial institution may reject the check at block 1005 by any appropriate method known in the art. In an embodiment, the financial institution may inform the third party that the customer identifying information entered into the portal or website is incorrect by any appropriate method including, for example, by displaying an error message on the customer's computer screen. In an embodiment, the financial institution may send a received substitute check, or received scanned image of the electronic check, back to its originator such as, for example, the bank of first deposit, Federal Reserve Bank, correspondent bank or clearinghouse corporation that processed the check. If the financial institution rejects the check or electronic check depositing request, the financial institution may, at block 1007, notify the customer of the rejected check or the rejected electronic check depositing request by any appropriate method. In an embodiment, the financial institution may take additional measures to enhance the security of the customer's account. For example, the financial institution may review a risk assessment stored for the customer or force the customer to modify customer identifying information to include, for example, a username, a password, website login information assigned to the customer by the financial institution or selected by the customer when creating an online account with the financial institution, a personal identification number (PIN), telephone call-in information assigned to the customer by the financial institution or selected by the customer during account set-up, a call-in password, or a call-in PIN.

If the customer identifying information on the received check 1100, or the customer identifying information from a check 1100 entered by a third party at a website or portal maintained by a financial institution, is authenticated, the financial institution may, at block 1009, determine the status of activating a checkbook, i.e., a plurality of checks, for the authenticated customer. In an embodiment, the financial institution may determine the status of activating a checkbook for the authenticated customer by comparing at least a portion of the customer identifying information for the authenticated customer stored in records or files possessed by the financial institution with at least a portion of the customer identifying information on the received check and by reviewing the status of the stored activation code. In an exemplary embodiment, the financial institution may determine the status of activating a checkbook for the authenticated customer by determining if the activation code stored in records or files possessed by the financial institution has been updated to indicate that it was activated by the authenticated customer. For example, the financial institution may determine the status of activating a checkbook for the customer by comparing the customer's name and account number on the received check, or as received electronically from a third party, to the stored customer name and customer account number to determine that the customer is authentic and by determining if the stored activation code has been updated to indicate that it was activated by the associated customer that was previously authenticated. In an alternate embodiment, the financial institution may simply determine the status of activating a checkbook for the authenticated customer using the stored activation code associated with the authenticated customer. If the authenticated customer is determined to not have an activated checkbook, the financial institution may reject the check or electronic check deposit transaction request by looping back to block 1005. In an embodiment, the financial institution may inform the third party that the customer does not have an activated checkbook by any appropriate method including, for example, by displaying an error message on the customer's computer screen.

If the authenticated customer is determined to have an activated checkbook, the financial institution may, at block 1011, authenticate the unique pseudorandom check code on the received check using the stored information for identifying the customer, at least a portion of the information for indentifying the customer on the received check and by comparing the unique pseudorandom check code on the received check with the stored unique pseudorandom check codes of the pseudorandom number sequence associated with the authenticated customer. In an exemplary embodiment, the financial institution may authenticate the unique pseudorandom check code on the received check by comparing it with the stored unique pseudorandom check codes of the pseudorandom sequence associated with the authenticated customer to determine if the received check pseudorandom check code matches one of the stored unique pseudorandom check codes for the activated checkbook. In an embodiment, the financial institution may authenticate deposit information entered by a third party at, for example, a website or portal maintained by the online banking service provider, including a unique pseudorandom check code, using the stored information for identifying the customer, at least a portion of the received information for indentifying the customer and by comparing the received unique pseudorandom check code with the stored unique pseudorandom check codes of the pseudorandom number sequence associated with the authenticated customer. If the received check pseudorandom check code does not match one of the stored unique pseudorandom check codes for the activated checkbook associated with the authenticated customer, the financial institution may reject the check or electronic check deposit transaction request by looping back to block 1005. However, if the customer identifying information and the unique pseudorandom check code included on the received check, or entered by a third party, are authenticated, and the checkbook for the authenticated customer is determined to be activated, then the received check or electronic check deposit transaction request is determined to be authentic and may be cleared automatically for payment. In an embodiment, a financial institution and/or check service provider may actively reconcile other check and/or transaction information with information in an online check register. For example, a financial institution may compare an amount of the received check 1100 or electronic check deposit transaction request against an amount registered by the customer in an online check register. In another embodiment, a financial institution may attempt to reconcile other information including, but not limited to, a payee name, a payee address, a transaction date, a transaction time, and/or a transaction description. If the received check or electronic check deposit transaction request information does not match information in an online check register, the financial institution may reject the check or electronic check deposit transaction request by looping back to block 1005. However, if the received check or electronic check deposit transaction request information are authenticated with the information in the online check register, the customer identifying information and the unique pseudorandom check code included on the received check, or entered by a third party, are authenticated, and the checkbook for the authenticated customer is determined to be activated, then the received check or electronic check deposit transaction request is determined to be authentic and may be cleared automatically for payment. In an embodiment, the received check or electronic check deposit transaction request information may be automatically authenticated with the information in an intelligent online check register.

In an embodiment, a customer may be provided with the capability to actively reconcile each of the plurality of checks in the activated checkbook through a financial institution or check service provider, including the capability to stop payment of a check, void a check, or cancel one or more of the plurality of outstanding checks in the activated checkbook online or offline using, for example, the financial institution's online banking website. If the customer has previously communicated to the financial institution his desire to void, cancel or stop payment for the received check, the financial institution may determine this fact, at block 1013, by comparing check identifying information including, for example, the check sequence number for the received check, at least a portion of the customer identifying information on the received check, and/or the unique pseudorandom check code number for the received check with the corresponding information stored in records or files possessed by the financial institution for the authenticated customer. If the authenticated customer is determined to have previously voided, cancelled or ordered payment stopped for the received check, the financial institution may reject the check by looping back to block 1005. The financial institution may notify a customer of an electronic check deposit transaction request, of a received check, of information regarding the received check or electronic check deposit transaction request including, but not limited to, a received check amount, a received check unique pseudorandom check code, received check MICR information, a check date, a check sequence number, a third party depositor's name, a third party depositor's account number, a third party depositor's bank's name, a third party depositor's bank identification number, and/or the third party depositor's routing transit number, a failure to authenticate any information included with an electronic check deposit transaction request or a received check against information stored by the financial institution and/or third party check service provider or against information registered by the customer in, for example, an online check register, and/or an updated balance amount in a customer's account. In an embodiment, a customer may be provided with the capability to actively reconcile a check of the plurality of checks in the activated checkbook or an electronic check deposit transaction request through a financial institution or check service provider based on the notification. The customer may provide the financial institution with notification preferences, including, but not limited to, notification information, notification times, notification quiet times, primary, secondary and/or tertiary notification mechanisms, such as electronic mail, SMS, telephone, mobile telephone, page, facsimile, or notification triggers or thresholds. Customer notification preferences may be maintained in records or files possessed by, or stored at, the financial institution, including, but not limited to, at data storage units 154, 156.

In an embodiment, if the authenticated customer is determined to have taken no prior action to reconcile the received check, and if the received check or electronic check deposit transaction request has been authenticated, the financial institution may, at block 1017, debit or release the amount of the authenticated customer's funds from the account associated with the received authenticated check. In another embodiment, at block 1015, the amount 1116 on the received authenticated check, or the amount received in the electronic check deposit transaction request, is compared with an account balance for the authenticated customer to determine if the authenticated customer has sufficient funds in the appropriate account to cover the received authenticated check. If the balance is determined to be insufficient, the financial institution may reject the check, or the electronic check deposit transaction request, by looping back to block 1005. However, if the balance is determined to be sufficient, the financial institution may then, at block 1017, debit or release the amount of the customer's funds from the customer's account associated with the received authenticated check. The customer may be able to obtain information and details of each check of the plurality of checks in the activated checkbook by contacting the financial institution through a wide variety of methods including, but not limited to, telephone, mobile telephone, SMS, electronic mail, physical mail or by entering and accessing the financial institution's electronic system for online banking. The customer may also be able to obtain information and details of the status of each of the customer's accounts by using similar methods known in the art.

As shown by the various configurations and embodiments illustrated in FIGS. 1-18, a system and method for securing financial information have been described.

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What we claim is:

1. A method for authenticating a check, the check being one of a plurality of checks, the check being previously issued from a payor to a payee, the method comprising:

receiving, at a third party processor, an amount of the check and information for identifying the check from the payor;

storing the amount of the check and information for identifying the check in non-volatile memory associated with the third party processor, wherein said stored an amount of the check and information for identifying the check is accessible to an online banking interface;

receiving, at the third party processor, the check having information for identifying the payor, a unique pseudorandom code of a pseudorandom sequence, wherein the pseudorandom sequence is generated via a random number processor using a secret key as an initial seed, and wherein the unique pseudorandom code is of a variable length for each check in the plurality of checks, and an amount;

determining, via the third party processor, a status of activating the plurality of checks using the information for identifying the payor included with the check, a stored activation code specific to the plurality of checks generated using a pseudorandom alphanumeric generator that generates each alphanumeric character of the activation code independently, and stored information for identifying the payor, the stored information for identifying the payor being stored with the pseudorandom sequence;

the online banking interface authenticating the at least a portion of the information for identifying the payor included with the check with the stored information for identifying the payor;

the online banking interface authenticating the unique pseudorandom code included with the check using at least a portion of the information for identifying the payor included with the check, the stored information for identifying the payor and the stored pseudorandom sequence;

the online banking interface authenticating the amount included with the check using the stored amount of the check and information for identifying the check; and authenticating, at the third party processor, the received check if the payor, the unique pseudorandom code included with the check and the amount included with the check are authenticated and if the plurality of checks have been activated.

2. The method of claim 1, further comprising:
the online banking interface authenticating the amount included with the check with the stored amount of the check; and
notifying the payor if the amount included with the check is unauthentic; and
receiving a request to cancel the check based on the notification.

3. The method of claim 2, further comprising notifying the payor of the canceled check.

4. The method of claim 1, further comprising:
providing the online banking interface to the payor for entering amount of the check and
information for identifying the check; and receiving the amount of the check and
information for identifying the check via the online banking interface.

5. The method of claim 4, wherein the online banking interface is provided at a website or a web portal of the third party processor.

6. The method of claim 1, wherein the information for identifying the check further comprises at least one of a name of a second party, an address of the second party, a check date, a time the check was drafted, or a check description.

7. The method of claim 1, further comprising:
associating the activation code with each unique pseudorandom code of the pseudorandom sequence included with each check of the plurality of checks;
associating the activation code with additional for identifying the payor; and
storing the activation code with each unique pseudorandom code and the associated additional information.

8. The method of claim 5, further comprising dynamically displaying stored information associated with the check to the payor, the stored information including the stored amount of the check and information for identifying the check, the stored unique pseudorandom code of the check, and the stored additional information.

9. The method of claim 6, wherein the stored information associated with the check is dynamically displayed in the online banking interface.

10. The method of claim 7, further comprising:
storing information associated with each check of the plurality of checks in a database accessible to the online banking interface, wherein said database resides on the non-volatile memory of the third party processor;
updating information associated with each check of the plurality of checks in the online banking interface using information received from the payor;
storing the updated information in the database accessible to the online banking interface; and
dynamically displaying the updated information in the online banking interface.

11. A method for authenticating a financial transaction request, the financial transaction request being representative of a check, the check being previously issued from a payor to a payee, the method comprising:
providing a third party financial transaction computer processor, the third party financial transaction computer processor having a computer readable storage medium, the computer readable storage medium comprising instructions stored therein for executing on said processor, the instructions when read and executed, for:
receiving a check amount and information for identifying the check from the payor;
storing the check amount and information for identifying the check in non-volatile memory of one or more third party financial transaction computer processors, wherein the stored check amount and information for identifying the check is accessible to an online banking interface;
receiving additional information including information for identifying the payor, a unique pseudorandom code associated with of the check, and the check amount, the unique pseudorandom code of the check comprising a portion of a pseudorandom sequence associated with a plurality of checks, wherein the pseudorandom sequence is generated via a pseudorandom generator using a secret key as an initial seed, and wherein the unique pseudorandom code is of a variable length for each check in the plurality of checks;
determining a status of activating the plurality of checks using at least a portion of the information for identifying the payor included with the additional information, a stored activation code specific to the plurality of checks generated using a pseudorandom alphanumeric generator that generates each alphanumeric character of the activation code independently, and stored information for identifying the payor, the stored information for identifying the payor being stored with the pseudorandom sequence and being accessible to the online banking interface;
the online banking interface authenticating the at least a portion of the information for identifying the payor included with the additional information with stored information for identifying the payor;
the online banking interface authenticating the unique pseudorandom code included with the additional information using at least a portion of the information for identifying the payor included with the additional information, the stored information for identifying the payor and the stored pseudorandom sequence;
the online banking interface authenticating the check amount included with the additional information using the stored check amount and information for identifying the check; and
authenticating the additional information if the at least a portion of the information for identifying the payor included with the additional information, the unique pseudorandom code included with the additional information and the check amount included with the additional information are authenticated and if the plurality of checks have been activated.

12. The method of claim 11, the computer readable storage medium further comprising instructions stored therein for executing on said processor, the instructions when read and executed, for:
the online banking interface authenticating the check amount included with the additional information with the stored check amount;
rejecting the additional information if the check amount included with the additional information is unauthentic; and
notifying the payor of the rejected additional information.

13. The method of claim 12, the computer readable storage medium further comprising instructions stored therein for executing on said processor, the instructions when read and executed, for:
providing the online banking interface to the payor to enable entering the check amount and information for identifying the check; and receiving the entered check amount and information for identifying the check via the online banking interface.

14. The method of claim 12, the computer readable storage medium further comprising instructions stored therein for executing on said processor, the instructions when read and executed, for:
dynamically displaying stored information associated with the check to the payor, the stored information including the stored check amount and information for identifying the check, the stored unique pseudorandom code of the check, and the stored additional information.

15. The method of claim 14, wherein the stored information associated with the check is dynamically displayed in online banking interface.

16. The method of claim 15, the computer readable storage medium further comprising instructions stored therein for executing on said processor, the instructions when read and executed, for:
storing information associated with each check of the plurality of checks in a database accessible to the online banking interface, wherein said database resides in non-volatile memory on the one or more third party financial transaction computer processors;
updating information associated with each check of the plurality of checks in an electronic check register using information received from the payor;
storing the updated information in the database accessible to the online banking interface; and
dynamically displaying the updated information in the online banking interface.

17. A method for authenticating a check, the method comprising:
receiving, at a processor, an indication that a plurality of checks were issued with an activation code to a payor, each of said plurality of checks including a unique pseudorandom code of a pseudorandom sequence, wherein the activation code is specific to the plurality of checks and generated using a pseudorandom alphanumeric generator that generates each alphanumeric character of the activation code independently, wherein the pseudorandom sequence is generated via pseudorandom sequence generator using a secret key as an initial seed, and wherein the unique pseudorandom code is of a variable length for each check in the plurality of checks;
automatically updating information in an electronic check register stored in non-volatile memory associated with the processor to indicate that the plurality of checks were issued to the payor,
storing the updated information in the non-volatile memory of the processor, wherein said stored updated information is accessible to the electronic check register;
receiving, at the processor, an indication that the plurality of checks were activated using the activation code;
automatically updating information in the electronic check register stored in the non-volatile memory associated with the processor to indicate that the plurality of checks were activated;
receiving, at the processor, from the payor a unique pseudorandom code of a check of the plurality of checks, and an amount of the check;
automatically updating information in the electronic check register stored in the non-volatile memory associated with the processor to indicate that the check was issued to a payee in the amount received from the payor;
receiving, at the processor, from the payee a unique pseudorandom code of a check and an amount of a check;
the electronic check register authenticating the check if the received unique pseudorandom code and amount matches the updated information in the electronic check register, and if the plurality of checks including the check has been activated; and
generating, using the processor, after any step of the method, at the request of the payor, a web-based representation of the electronic check register allowing the payor to view the status of at least one of said plurality of checks via an online banking interface to the electronic check register.

18. The method of claim 17, further comprising:
the electronic check register authenticating the amount included with the check with the stored first information amount of the check; and
rejecting the check if the amount included with the check is unauthentic.

* * * * *